(12) United States Patent
Ushigome

(10) Patent No.: US 9,285,518 B2
(45) Date of Patent: Mar. 15, 2016

(54) DIFFRACTIVE OPTICAL ELEMENT, OPTICAL SYSTEM, AND OPTICAL APPARATUS

(71) Applicant: CANON KABUSHIKI KAISHA, Tokyo (JP)

(72) Inventor: Reona Ushigome, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 643 days.

(21) Appl. No.: 13/710,681

(22) Filed: Dec. 11, 2012

(65) Prior Publication Data

US 2013/0155514 A1 Jun. 20, 2013

(30) Foreign Application Priority Data

Dec. 16, 2011 (JP) ................. 2011-275790

(51) Int. Cl.
*G02B 5/18* (2006.01)
*G02B 27/42* (2006.01)

(52) U.S. Cl.
CPC ............ *G02B 5/18* (2013.01); *G02B 5/1814* (2013.01); *G02B 5/1866* (2013.01); *G02B 27/4211* (2013.01); *G02B 27/4272* (2013.01)

(58) Field of Classification Search
CPC .......... G02B 3/08; G02B 5/18; G02B 5/1814; G02B 5/1819; G02B 5/1823; G02B 5/1866; G02B 5/1876; G02B 5/188; G02B 27/42; G02B 27/4205; G02B 27/4211; G02B 27/4233; G02B 27/4238; G02B 27/4274; G02B 27/4277

USPC ......... 359/558, 565–567, 569, 571, 574, 576; 369/112.03–112.14, 112.2; 349/193, 349/201–202

See application file for complete search history.

(56) References Cited

U.S. PATENT DOCUMENTS

| 8,270,080 | B2 | 9/2012 | Nakabayashi | |
|---|---|---|---|---|
| 2012/0120494 | A1* | 5/2012 | Takayama | G02B 5/1823 359/576 |
| 2012/0320461 | A1* | 12/2012 | Nakabayashi | G02B 5/1852 359/570 |

FOREIGN PATENT DOCUMENTS

| JP | 09-127321 A | 5/1997 |
|---|---|---|
| JP | 2008-241734 A | 10/2008 |
| JP | 2008242390 A | 10/2008 |
| JP | 2010160474 A | 7/2010 |
| WO | 2011099550 A1 | 8/2011 |

OTHER PUBLICATIONS

Japanese Office Action issued in counterpart application No. JP2011-275790, dated Sep. 29, 2015.

* cited by examiner

*Primary Examiner* — Kimberly N Kakalec
(74) *Attorney, Agent, or Firm* — Rossi, Kimms & McDowell LLP

(57) ABSTRACT

A diffractive optical element made by adhering a first diffractive grating and a second diffractive grating to each other, each of which has a blazed structure. At least one of the first and second diffractive gratings is made of a material having a refractive index distribution in a plane normal direction, and the predetermined expressions are satisfied for a wavelength $\lambda$ in a visible wavelength range.

19 Claims, 19 Drawing Sheets

DIFFRACTIVE OPTICAL ELEMENT, OPTICAL SYSTEM, AND OPTICAL APPARATUS

BACKGROUND OF THE INVENTION

1. Field of the Invention

The present invention relates to a diffractive optical element, an optical system, and an optical apparatus.

2. Description of the Related Art

A diffractive optical element of a blazed structure is configured to highly efficiently diffract light of one specific order (or designed order) and a specific wavelength. For sufficiently high diffractive efficiency of the specific order in an overall visible wavelength range, Japanese Patent No. 3,717,555 discloses two diffractive gratings adhered to each other. Each diffractive grating is made of a low refractive index high dispersion material and a high refractive index low dispersion material. A height of the diffractive grating is properly set. The diffractive optical element of this type will be referred to as an "adhesion two-layer DOE" hereinafter. For high diffractive efficiency equal to or higher than 99% in the overall visible wavelength range, Japanese Patent Laid-Open No. 2008-241734 uses a material which has a partial dispersion ratio θgF smaller than that of a usual material (or a linear abnormal dispersion).

However, due to the behavior of the wall surface section that provides no diffractive action, the wavelength characteristic of the diffractive efficiency of the diffracted light of the designed order reduces on the long wavelength side, and the diffractive efficiency of the red wavelength range becomes lower than that of the blue wavelength range. Unnecessarily diffracted light other than the designed order is likely to stand out on the red wavelength range. If the red wavelength range is relatively intensified by using an antireflective film, image processing, etc. for color balancing of the diffracted light of the designed order, unnecessary light in the red wavelength is also intensified and highlighted.

SUMMARY OF THE INVENTION

The present invention provides a diffractive optical element, optical system, and optical apparatus, which can reduce wavelength characteristic scattering of diffractive efficiency in diffracted light of a designed order.

A diffractive optical element according to the present invention is made by adhering a first diffractive grating and a second diffractive grating to each other. Each of the first diffractive grating and the second diffractive grating includes a blazed structure in which a plurality of gratings each having a sawtooth shape are arranged in a grating period direction. At least one of the first diffractive grating and the second diffractive grating is made of a material having a refractive index distribution in a plane normal direction perpendicular to the grating period direction. The following expressions are satisfied for an arbitrary wavelength $\lambda$ in a visible wavelength range:

$$\Delta\Phi1(\lambda)=1-\{n22(\lambda)-n11(\lambda)\}d/m\lambda$$

$$\Delta\Phi2(\lambda)=1-\{n21(\lambda)-n12(\lambda)\}d/m\lambda$$

$$\Delta\Phi1(\lambda)\times\Delta\Phi2(\lambda)<0.$$

Herein, $n11(\lambda)$ and $n12(\lambda)$ are refractive indices for light having the wavelength $\lambda$ of a base section of the sawtooth shape of the first diffractive grating and an apex section of the sawtooth shape of the first diffractive grating, respectively, $n21(\lambda)$ and $n22(\lambda)$ are refractive indices for the light having the wavelength $\lambda$ of a base section of the sawtooth shape of the second diffractive grating and an apex section of the sawtooth shape of the second diffractive grating, respectively, d is an absolute value of a grating height of the first or second diffractive grating, and m is a designed order.

Further features of the present invention will become apparent from the following description of exemplary embodiments with reference to the attached drawings.

DESCRIPTION OF THE EMBODIMENTS

Figure 1:
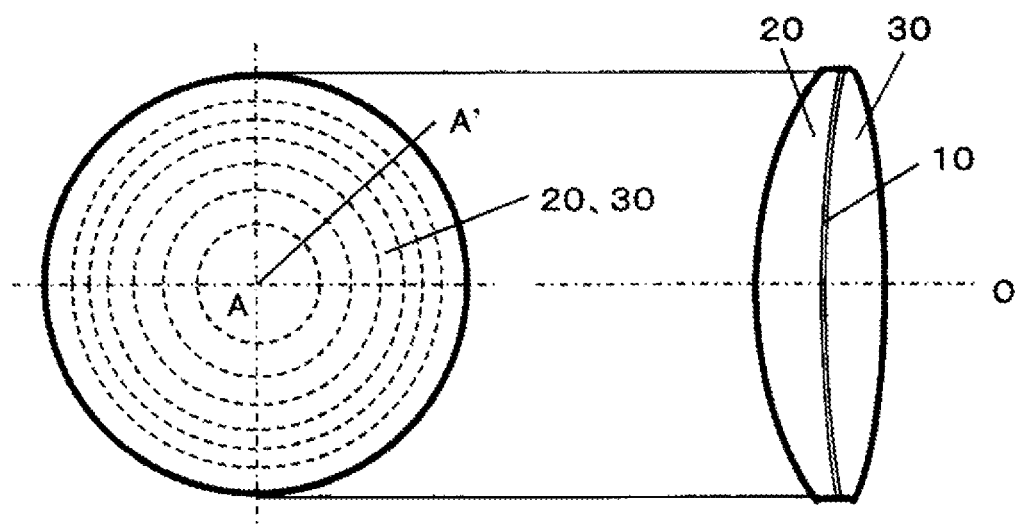
FIG. 1 illustrates plan and side views of a diffractive optical element according to first to eight embodiments.

FIG. 1 illustrates front and side views of a diffractive optical element ("DOE") 10 according to this embodiment. The DOE 10 is formed on surfaces of substrate lenses 20 and 30 made of a flat plate or a lens. In this embodiment, the substrate lenses 20 and 30 configured to form the DOE 10 have curved surfaces. The DOE 10 has a shape of a concentric diffractive grating around the optical axis O, and exhibits a lens operation.

Figure 17:
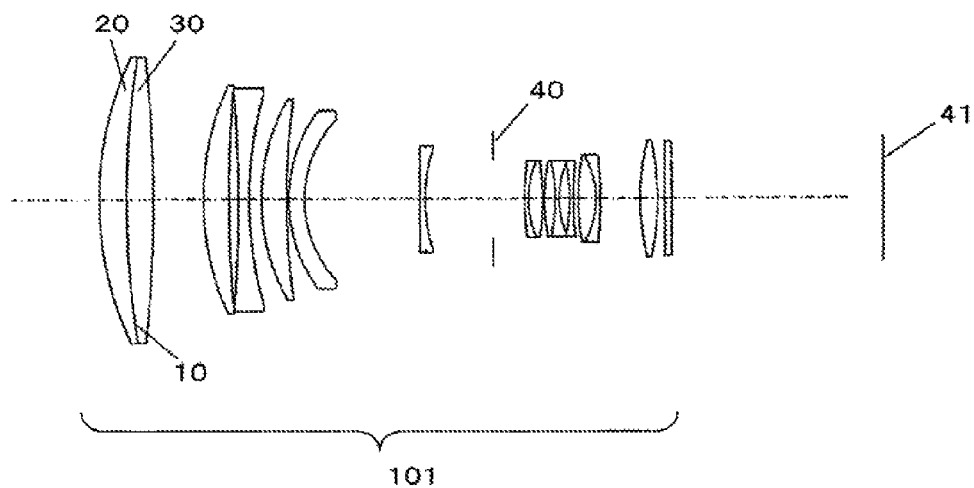
FIG. 17 is a sectional view of an optical system having the diffractive optical element illustrated in FIG. 1 according to the first to eighth embodiments.

FIG. 17 is a sectional view of an image pickup lens (image pickup optical system) 101 for a digital still camera, and the image pickup lens 101 includes a stop 40 and the DOE 10. Reference numeral denotes an image plane on which a photoelectrical conversion element, such as a film or a CCD, is arranged. The DOE 10 corrects the chromatic aberration of the image pickup lens 101. The DOE 10 has an excellent wavelength characteristic and high diffractive efficiency, as described later, and provides a high performance image pickup lens.

The DOE 10 is provided on a cementing surface of the front lens in FIG. 17, but the structure is not limited to this configuration. The DOE 10 may be provided at another location or a plurality of DOEs 10 may be used for the image pickup lens.

The optical apparatus for the optical system is not limited to the image pickup lens for the digital still camera, and may be applied to an image pickup lens for a video camera, a reader lens for a scanner or a digital copier in a business machine, and an optical system for an optical apparatus for a wide wavelength range.

A detailed description will now be given of a variety of embodiments of the DOE 10 with reference to the accompanying drawings.

First Embodiment

Figure 2A:
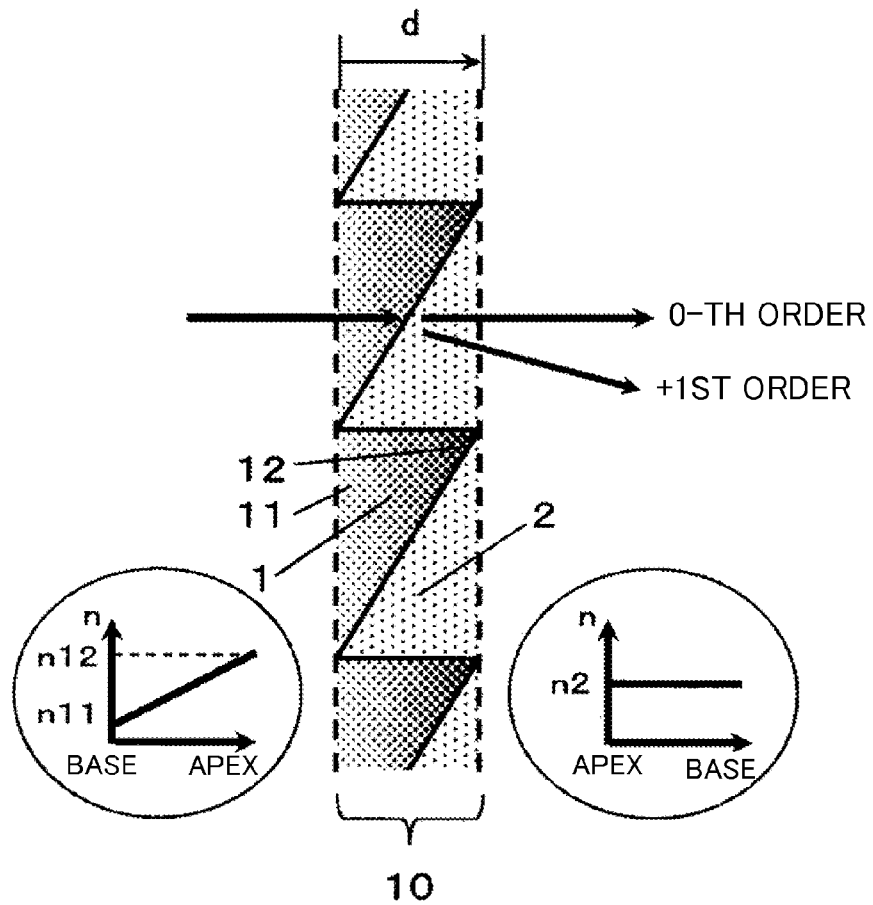
FIGS. 2A and 2B are partially enlarged sectional views of the diffractive optical element taken along an A-A' line illustrated in FIG. 1 according to the first and second embodiments.

FIG. 2A is a partially enlarged sectional view of the DOE 10 taken along an A-A' line in FIG. 1 according to the first embodiment. For better understanding of the grating shape, FIG. 2A is considerably deformed in the height direction (depth direction), and the substrate lenses 20 and 30 have plane surfaces on which the DOE 10 is formed.

The DOE 10 is an adhesion DOE in which a first diffractive grating 1 and a second diffractive grating 2 are adhered to each other (or laminated). Each of the first and second diffractive gratings 1 and 2 has a concentric grating shape of a blazed structure, and exhibits a lens operation (convergence effect or divergence effect) by gradually changing the grating pitch from the center (optical axis) to the periphery. Each of the diffractive gratings 1 and 2 serves as one DOE 10 through all layers. The blazed structure enables the incident light upon the DOE 10 to diffract in a specific diffracted order direction (which is the +1st order direction in FIG. 2A). In the blazed structure, a plurality of gratings each having a sawtooth shape are arranged in the grating period direction (toward from the optical axis to the periphery in FIG. 1).

Since the operating wavelength range of the DOE 10 is a visible range, the materials and the grating height for the first diffractive grating 1 and the second diffractive grating 2 are selected so that the diffractive efficiency of the diffracted light of the designed order can increase in the overall visible range. In other words, the material and the grating height of each diffractive grating are determined so that a maximum optical path length difference of light that passes a plurality of diffractive gratings, such as the first and second diffractive gratings 1 and 2, (which is a maximum value of the optical path length difference between the thread and root in the diffractive portion) can be equal to or close to an integral multiple of the wavelength in the operating wavelength range. High diffractive efficiency is obtained in the overall operating wavelength range by properly setting the material and the shape of each diffractive grating. In general, the grating height of the diffractive grating is defined as a distance between the grating groove and the grating tip in a plane normal direction perpendicular to the grating period direction.

Figure 18:
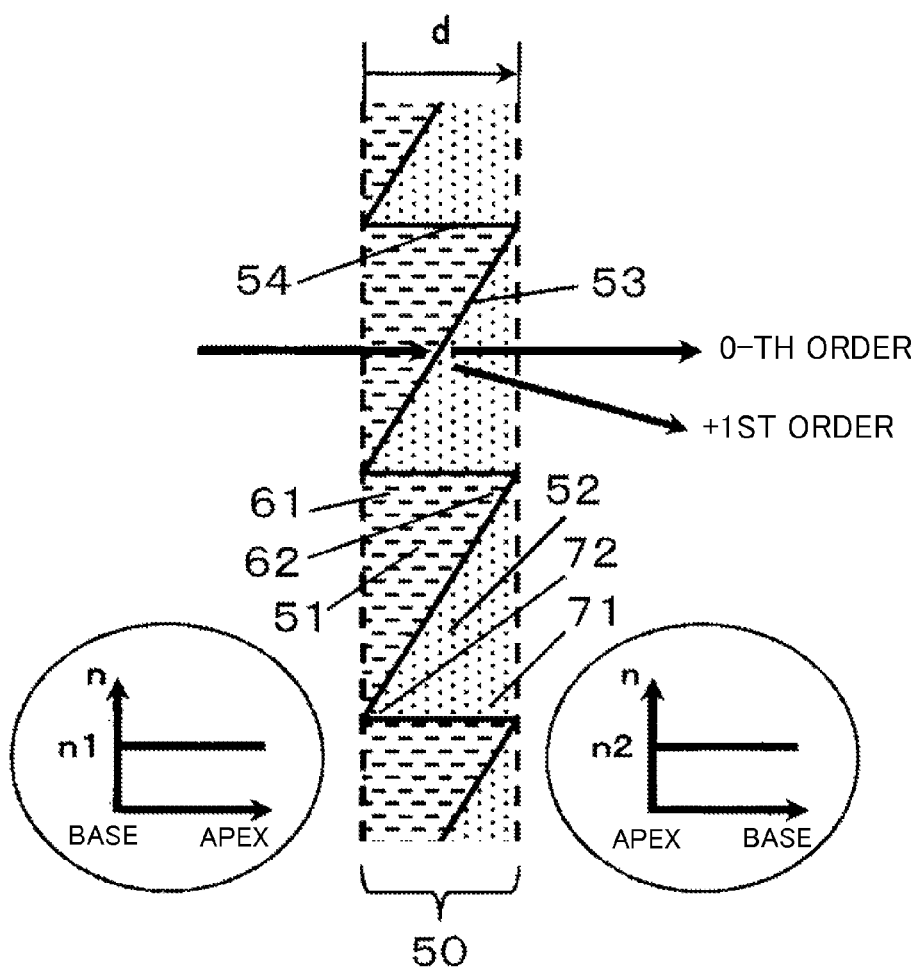
FIG. 18 is a partially sectional view of a diffractive optical element according to comparative example 1.

A description will now be given of the diffractive efficiency that uses the conventional scalar diffraction theory, with reference to FIG. 18. FIG. 18 is a partially enlarged sectional view of the DOE 50 as a comparative example corresponding to FIG. 2A, and the DOE 50 is an adhesion DOE including a first diffractive grating 51 and a second diffractive grating 52.

An abscissa axis in a lower left graph in FIG. 18 denotes a position of the base plane (broken line) from a base section 61 to an apex section 62 in the plane normal direction in the first diffractive grating 51. An ordinate axis denotes a refractive index of the material of the first diffractive grating 51 at the position of the first diffractive grating 51. An abscissa axis in the lower right graph in FIG. 18 denotes a position of the base plane (broken line) from a base section 61 to an apex section 62 in the plane normal direction in the second diffractive grating 52. An ordinate axis denotes a refractive index of the material of the second diffractive grating 52 at the position of the second diffractive grating 52. The scalar diffraction theory assumes that the material of the diffractive grating has a uniform refractive index.

Since the DOE 50 is made by adhering two grating surfaces of the two diffractive gratings to each other, a conditional expression that maximizes the diffractive efficiency of the diffracted light of the diffracted order m for a wavelength λ under the vertical incidence upon the base surface of the diffractive grating becomes as follows:

$$(n2-n1)d=m\lambda \quad (1)$$

In Expression (1), n1 denotes a refractive index of the material of the first diffractive grating 51 for the wavelength λ, n2 denotes a refractive index of the material of the second diffractive grating 52 for the wavelength λ, d denotes the grating height of each of the first and second diffractive gratings 51 and 52, and m denotes the diffracted order. When it is assumed that a ray that downwardly diffracts from the 0-th light in FIG. 18 is a positive diffracted order, a sign of d is negative when the grating height of the diffractive grating increases from the bottom to the top in FIG. 18 and it is positive when the grating height of the diffractive grating decreases.

In the configuration of FIG. 18, the diffractive efficiency η(λ) for the wavelength λ becomes as follows:

$$\eta(\lambda)=\sin c^2[\pi\{m-(n2-n1)d/\lambda\}] \quad (2)$$

The adhesion two-layer DOE can provide high diffractive efficiency in a wide wavelength range when a low refractive index high dispersion material is used for the first diffractive grating 51 and a high refractive index low dispersion material is used for the second diffractive grating 52. It is known that use of a low refractive index high dispersion material that has a linear dispersion characteristic or a partial dispersion ratio θgF smaller than that of a usual material is effective for diffractive efficiency of 99% or higher in the overall visible range. One known method of obtaining this linear dispersion characteristic is to disperse Indium Tin Oxide (ITO hereinafter) nanoparticles in the base resin material.

The diffractive efficiency of each of the DOEs disclosed in Japanese Patent No. 3,717,555 and Japanese Laid-Open No. 2008-241734 is calculated by using the scalar diffraction theory for the design evaluation. It is known that the calculation based upon the scalar diffraction theory can be precise as long as the pitch of the diffractive grating is sufficiently larger than the wavelength, but the behavior of the wall surface section 54 of the diffractive grating is not considered at all.

A description will now be given of the diffractive efficiency using the rigorous electromagnetic field calculation. The rigorous electromagnetic field calculation is a calculating method that considers the wall surface section of the DOE. In this embodiment, the diffractive efficiency of the DOE is evaluated with Rigorous Coupled Wave Analysis ("RCWA" hereinafter) as one of the rigorous electromagnetic field calculations.

In the DOE of this embodiment, a material of the diffractive grating has a refractive index distribution in the plane normal direction from the base surface whereas the conventional diffractive grating is made of a uniform material pursuant to the scalar diffraction theory. In this embodiment, the first diffractive grating 1 is made of a material that has a refractive index distribution in the plane normal direction, as illustrated in FIG. 2A.

The abscissa axis of a lower left graph in FIG. 2A denotes a position of the base surface (broken line) from the base section 11 to the apex section 12 in the plane normal direction in the first diffractive grating 1. The ordinate axis denotes a refractive index of the material of the first diffractive grating 1. The lower right graph in FIG. 2A relates to the diffractive grating 2 similar to the graph for the diffractive grating 1.

The first diffractive grating 1 is made of ultraviolet ("UV") curing resin in which ITO nanoparticles are mixed with acrylic fluorine UV curing resin, and has a refractive index distribution. The refractive index n11 of the base section 11 corresponds to the refractive index in which the ITO nanoparticles are mixed by 13.95%, and the refractive index n12 of the apex section 12 corresponds to the refractive index in which the ITO nanoparticles are mixed by 16.05%. The refractive index distribution linearly (or monotonously) increases from the base section 11 to the apex section 12. The dispersion ratio of the ITO nanoparticle is 13.95% different from 16.05% in the plane normal direction.

The second diffractive grating 2 is made of UV curing resin in which $ZrO_2$ nanoparticles are uniformly mixed by 6% with acrylic UV curing resin.

Table 1 illustrates numerical values of the refractive indices of the base sections and the apex sections of the first and second diffractive gratings 1 and 2 and refractive indices of the apex section. The grating height d is 11.02 μm, the designed order is $+1^{st}$ order, and the grating pitch is 100 μm.

TABLE 1

| | FIRST DIFFRACTIVE GRATING | | SECOND DIFFRACTIVE GRATING |
|---|---|---|---|
| WAVE-LENGTH | REFRACTIVE INDEX OF BASE SECTION n11 ITO-13.95% | REFRACTIVE INDEX OF APEX SECTION n12 ITO-16.05% | REFRACTIVE INDEX OF APEX SECTION n22 = REFRACTIVE INDEX OF BASE SECTION n21 $ZrO_2$-6% |
| 400 nm | 1.52696 | 1.53916 | 1.56975 |
| 450 nm | 1.51519 | 1.52646 | 1.56192 |
| 500 nm | 1.50560 | 1.51600 | 1.55631 |
| 550 nm | 1.49774 | 1.50739 | 1.55229 |
| 600 nm | 1.49076 | 1.49968 | 1.54932 |
| 650 nm | 1.48401 | 1.49219 | 1.54705 |
| 700 nm | 1.47709 | 1.48446 | 1.54523 |

A refractive index relationship of the adhesion two-layer DOE having a refractive index distribution is defined with $\Delta\Phi1$ and $\Delta\Phi2$ in the following expressions:

$$\Delta\Phi1(\lambda)=1-\{n22(\lambda)-n11(\lambda)\}d/m\lambda$$

$$\Delta\Phi2(\lambda)=1-\{n21(\lambda)-n12(\lambda)\}d/m\lambda \quad (3)$$

Figure 2B:
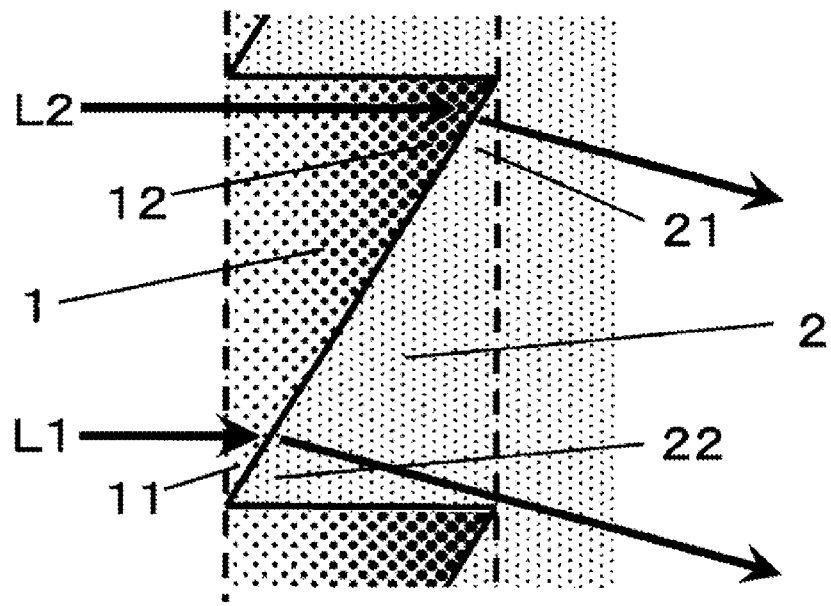

As illustrated in FIG. 2B, $\Delta\Phi1$ in Expression (3) corresponds to a phase change (ray L1 of FIG. 2B) between the base section of the first diffractive grating and the apex section of the second diffractive grating, and $\Delta\Phi2$ correspond to a phase change (ray L2 of FIG. 2B) between the apex section of the first diffractive grating and the base section of the second diffractive grating the second diffractive grating. When both $\Delta\Phi1$ and $\Delta\Phi2$ become 0, the diffractive efficiency of the designed order becomes 100% under the scalar diffraction theory. The phase advances when they are positive, and delays when they are negative.

When the material of the diffractive grating has a refractive index distribution, $\Delta\Phi1$ and $\Delta\Phi2$ are different from each other, a phase difference occurs, and the diffractive efficiency deteriorates. Nevertheless, when the phase changes of $\Delta\Phi1$ and $\Delta\Phi2$ are cancelled out (for example, by making $\Delta\Phi1$ positive and $\Delta\Phi2$ negative), the diffractive efficiency of the diffracted light of the designed order can be improved in the adhesion two-layer DOE that has a refractive index distribution.

FIG. 3 is a graph illustrating a result of the diffractive efficiency at the incidence angle of 0° (deg) evaluated by the RCWA calculation.

Figure 3A:
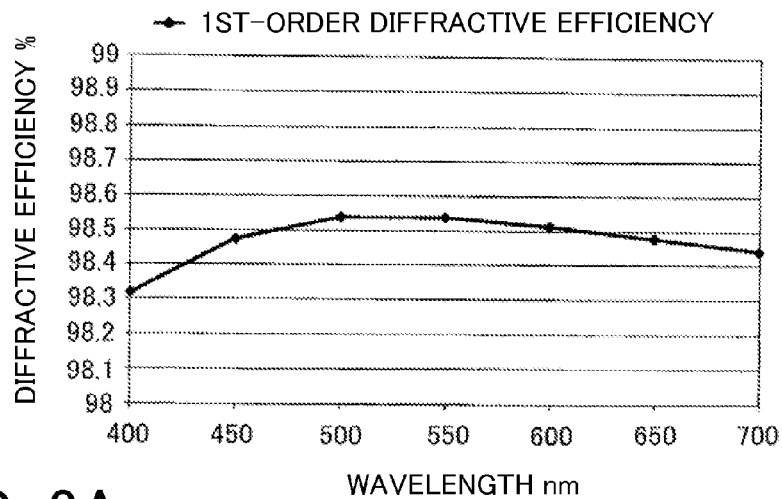
FIGS. 3A-3C are graphs of the diffractive efficiency of the diffractive optical element illustrated in FIG. 2 according to the first embodiment.

FIG. 3A is a graph illustrating a wavelength characteristic of the diffractive efficiency of the +1st order diffracted light as the designed order. The abscissa axis denotes a wavelength (nm), and the ordinate axis denotes diffractive efficiency (%). The diffractive efficiency that considers the behavior of the wall surface section is almost uniform in the visible wavelength range of 430-680 nm.

Figure 3B:
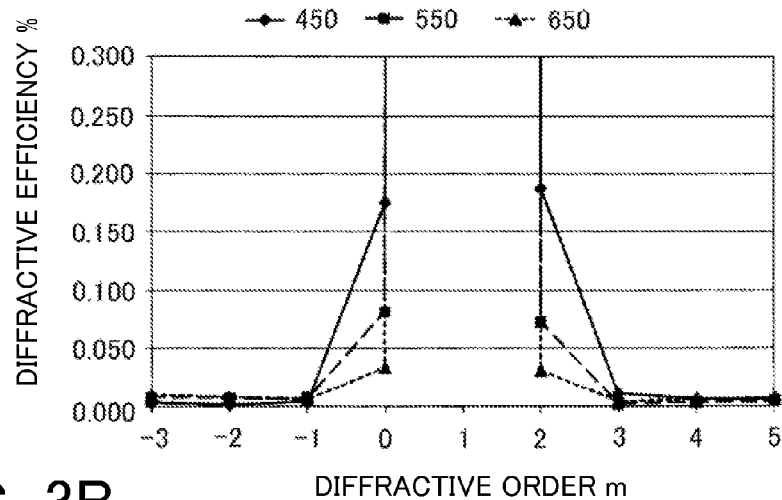

FIG. 3B is a graph of diffractive efficiency of low order diffracted light from −3rd order to +5th order for wavelengths of 450 nm (black dot), 550 nm (black square), and 650 nm (black triangle), and illustrates enlarged part of the low diffractive efficiency. The abscissa axis denotes the designed order (m), and the ordinate axis denotes the diffractive efficiency (%). The diffractive efficiency of the 0-th order light for 450 nm and the diffractive efficiency of the +2nd order diffracted light for 450 nm are higher than those for 650 nm.

Figure 3C:
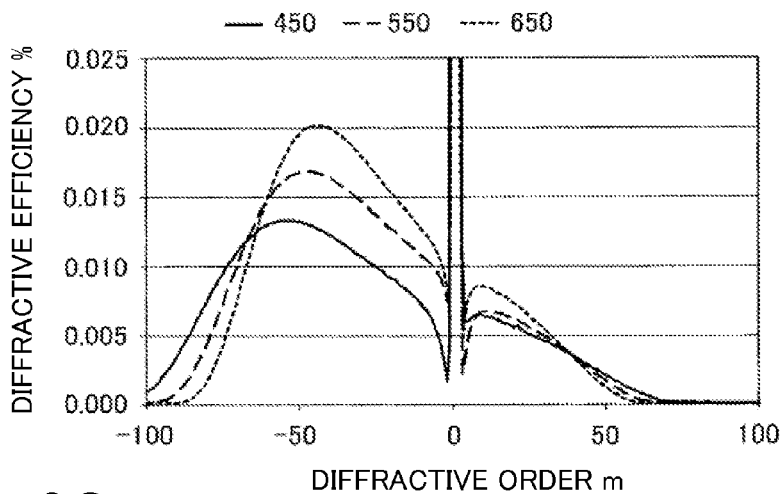

FIG. 3C is a graph of diffractive efficiency of high order diffracted light for the wavelengths of 450 nm (solid line), 550 nm (broken line), and 650 nm (dotted line), and illustrates enlarged part of the low diffractive efficiency. The abscissa axis denotes the designed order (m) and the ordinate axis denotes the diffractive efficiency (%).

From FIG. 3C, a peak of the diffractive efficiency of the unnecessary diffracted light from $-60^{th}$ order to $-40^{th}$ order for 650 nm is higher than that for 450 nm. This is due to a diffraction phenomenon that occurs even with the vertical incidence upon the wall surface section, and the diffraction phenomenon varies at almost the same rate according to the wavelength. The wavelength characteristic of the diffractive efficiency of the designed order is almost uniform when the unnecessary light of the high order light and the unnecessary light of the low order light are balanced.

The low order diffracted light on the short wavelength side is less conspicuous and thus less influential. The low order diffracted light on the short wavelength side tends to be less influential because the absorption on the short wavelength side tends to increase due to the increased number of lenses in the image pickup optical system required for high image quality in the digitalization and large printing of the recent optical apparatus.

Table 2 illustrates numerical values of $\Delta\Phi1$ $\Delta\Phi2$, $\Delta\Phi1 \times \Delta\Phi2$, and $\Delta\Phi1+\Delta\Phi2$ expressed in Expression (3), and $\Phi av$ expressed in the following expression according to the first embodiment:

$$\Phi av(\lambda)=\{n1av(\lambda)-n2av(\lambda)\}d/m\lambda \qquad (4)$$

Herein, $n1av(\lambda)$ and $n2av(\lambda)$ are average refractive indices for the wavelength $\lambda$ of the base sections and the apex sections of the materials of the first and second diffractive gratings 1 and 2 as follows:

$$n1av(\lambda)=\{n11(\lambda)+n12(\lambda)\}/2 \qquad (5)$$

$$n2av(\lambda)=\{n21(\lambda)+n22(\lambda)\}/2 \qquad (6)$$

TABLE 2

| WAVE-LENGTH | $\Delta\Phi1$ | $\Delta\Phi2$ | $\Delta\Phi1 \times \Delta\Phi2$ | $\Delta\Phi1 + \Delta\Phi2$ | $\Phi av$ |
|---|---|---|---|---|---|
| 400 nm | −0.1792 | 0.1570 | −0.0281 | −0.0222 | 1.0111 |
| 450 nm | −0.1447 | 0.1314 | −0.0190 | −0.0133 | 1.0066 |
| 500 nm | −0.1180 | 0.1114 | −0.0132 | −0.0066 | 1.0033 |
| 550 nm | −0.0932 | 0.1001 | −0.0093 | 0.0069 | 0.9965 |
| 600 nm | −0.0758 | 0.0882 | −0.0067 | 0.0124 | 0.9938 |
| 650 nm | −0.0688 | 0.0699 | −0.0048 | 0.0011 | 0.9995 |
| 700 nm | −0.0729 | 0.0432 | −0.0031 | −0.0297 | 1.0149 |

This inventor has discovered that the wavelength characteristic of the diffractive efficiency becomes almost uniform when at least one diffractive grating is made of a material having a refractive index distribution in the plane normal direction and the refractive index satisfies the following expression for an arbitrary wavelength $\lambda$ in the visible wavelength range:

$$\Delta\Phi1(\lambda)\times\Delta\Phi2(\lambda)<0 \qquad (7)$$

When Expression (7) is satisfied, the phase change between the base section of the first diffractive grating and the apex section of the second diffractive grating and the phase change between the apex section of the first diffractive grating and the base section of the second diffractive grating can be cancelled out. Unless Expression (7) is satisfied, these phase changes cannot be cancelled out and the diffractive efficiency is deteriorated.

As the product $\Delta\Phi1\times\Delta\Phi2$ between $\Delta\Phi1$ and $\Delta\Phi2$ in Expression (3) is made smaller for a shorter wavelength, the wavelength characteristic of the diffractive efficiency can be almost uniform. When this relationship is satisfied, the unnecessary light of the high order light and the unnecessary light of the low order light can be well balanced on the short wavelength side.

When the visible wavelength range contains a wavelength that enables the product $\Delta\Phi1\times\Delta\Phi2$ between $\Delta\Phi1$ and $\Delta\Phi2$ in Expression (3) to be 0, the wavelength characteristic of the diffractive efficiency can be almost uniform. When this relationship is satisfied, the wavelength characteristic of the diffractive efficiency can be almost uniform in the overall visible wavelength range.

When $\Delta\Phi1+\Delta\Phi2$ satisfies the following expression for the arbitrary wavelength $\lambda$ in the visible wavelength range, the uniform wavelength characteristic and high diffractive efficiency can be obtained:

$$|\Delta\Phi1(\lambda)+\Delta\Phi2(\lambda)|<0.03 \qquad (8)$$

When this relationship is satisfied, the phase change between the base section of the first diffractive grating and the apex section of the second diffractive grating and the phase change between the apex section of the first diffractive grating and the base section of the second diffractive grating can be cancelled out and high diffractive efficiency can be obtained.

The uniformity of the wavelength characteristic can be improved when $\Delta\Phi1+\Delta\Phi2$ continuously increases or continuously decreases with a shorter wavelength in one half or more of the visible wavelength range. When $\Delta\Phi1+\Delta\Phi2$ is 0, the refractive index distribution can be cancelled out and the diffractive grating equivalent to the scalar diffraction theory can be obtained.

When $\Delta\Phi1+\Delta\Phi2$ continuously increases or continuously decreases with a shorter wavelength, the low order unnecessary light increases on the short wavelength side. The unnecessary light of the high order diffracted light reduces with a shorter wavelength due to the diffraction phenomenon by the wall surface section. As a result, the unnecessary light of the higher order light and the unnecessary light of the low order light can be well balanced, and the uniformity of the wavelength characteristic of the diffractive efficiency of the designed order can be improved. Although it continuously decreases in this embodiment, a similar effect can be obtained even when it continuously increases.

High diffractive efficiency can be obtained when the refractive index in the refractive index distribution of the DOE satisfies the following expression for the arbitrary wavelength $\lambda$ in the visible wavelength range:

$$0.98<\{n1av(\lambda)-n2av(\lambda)\}d/m\lambda<1.02 \qquad (9)$$

Herein, $n1av(\lambda)$ and $n2av(\lambda)$ are average refractive indices for the wavelength $\lambda$ of the base sections and the apex sections of the materials of the first and second diffractive gratings 1 and 2. Unless Expression (9) is satisfied, it parts from the scalar diffraction theory and it is difficult to obtain high diffractive efficiency even when the refractive index distribution is cancelled.

Unless the maximum refractive index difference for the d-line in the refractive index distribution of the DOE is 0.015 or less, the refractive index distribution has an excessively large amount and it is difficult to obtain the uniform wavelength characteristic and high diffractive efficiency. Unless the maximum refractive index difference for the d-line in the refractive index distribution of the DOE is 0.002 or higher, the scalar diffraction theory becomes dominant and the effect of this embodiment is hard to obtain.

While this embodiment uses the material in which nanoparticles are mixed with the base resin material, the refractive index can be adjusted by changing a nanoparticle mixture ratio. Moreover, the refractive index of each diffractive grating may be adjusted by changing the UV curing manufacturing process.

In particular, the refractive index distribution can be controlled by optimizing the UV irradiation process. When the irradiance condition is adjusted, the nanoparticles gather in the counter direction to the UV irradiation direction because the UV curing resin components cure. As a result, the nanoparticle mixture ratio changes in the UV irradiating direction and the refractive index distribution occurs. More specifically, a refractive index distribution can be wider by lowering the UV irradiation intensity and by extending the irradiation time period even if the UV irradiation energy is the same because it takes a longer time for the UV curing resin components to cure.

In order for the DOE of this embodiment to obtain high diffractive efficiency of 99% or higher in the overall visible wavelength range, use of a material that has a partial dispersion ratio egF smaller than that of a usual material (linear abnormal dispersion characteristic) is effective and use of the resin in which ITO nanoparticles are dispersed is also effective.

Unless a volume ratio of the refractive index difference is 0.5% or higher in the resin that has dispersed nanoparticles and a refractive index distribution, the effect of this embodiment is hard to obtain. Unless it is 5% or less, the refractive index distribution has an excessively large amount and it becomes difficult to obtain the uniformity of the wavelength characteristic and high diffractive efficiency.

While this embodiment utilizes a material in which the base resin material is mixed with nanoparticles, the material of the diffractive grating is not limited to this material as long as there is a refractive index distribution.

The manufacturing process of the diffractive grating may be arbitrarily changed. The absolute value of the diffractive efficiency becomes larger when the refractive index distribution of the apex section is wider than that of the base section in the plane normal direction in the diffractive grating.

In one of the first diffractive grating 1 and the second diffractive grating 2, a refractive index distribution of the base section 11 is wider than that of the apex section 12. The other of the first diffractive grating 1 and the second diffractive grating 2 has a constant refractive index or a refractive index distribution of the apex section 12 is narrower than that of the base section 11. At this time, an absolute value of a maximum refractive index difference in the refractive index distribution of one of the first diffractive grating 1 and the second diffractive grating 2 may be larger than that of the other of the first diffractive grating 1 and the second diffractive grating 2. This is because the absolute value of the diffractive efficiency can be improved by increasing the influence of the diffractive grating in which the refractive index distribution of the apex section is wider than that of the base section.

The absolute value of the diffractive efficiency improves when the refractive index distribution of the apex section is wider than that of the base section in each of the first and second diffractive gratings in the plane normal direction. Since the diffractive efficiency of the oblique incidence upon the DOE decreases, the +1st order or −1st order is suitable for the designed order. Since the diffraction phenomenon by the grating wall surface in the DOE becomes more influential and the diffractive efficiency of the designed order decreases, a grating pitch of 80 μm or wider is suitable. In general, the grating pitch for the DOE 10 is 10 mm or less for use with the image pickup lens.

Comparative Example 1

Comparative example 1 is illustrated so as to further clarify the effects of this embodiment. Comparative example 1 is designed on the basis of the scalar diffraction theory. The first diffractive grating is made of UV curing resin in which ITO nanoparticles are uniformly mixed by 15% with acrylic fluorine UV curing resin, and the second diffractive grating is made of UV curing resin in which $ZrO_2$ nanoparticles are uniformly mixed by 6% with acrylic fluorine UV curing resin. Table 3 illustrates numerical values of refractive indices of the first and second diffractive gratings. The grating height d is 11.02 μm, the designed order is +1st order, and the grating pitch is 100 μm.

TABLE 3

| WAVE-LENGTH | FIRST DIFFRACTIVE GRATING REFRACTIVE INDEX OF BASE SECTION n11 = REFRACTIVE INDEX OF APEX SECTION n12 ITO-15% | SECOND DIFFRACTIVE GRATING REFRACTIVE INDEX OF APEX SECTION n22 = REFRACTIVE INDEX OF BASE SECTION n21 $ZrO_2$-6% |
|---|---|---|
| 400 nm | 1.53346 | 1.56975 |
| 450 nm | 1.52109 | 1.56192 |
| 500 nm | 1.51095 | 1.55631 |
| 550 nm | 1.50239 | 1.55229 |
| 600 nm | 1.49488 | 1.54932 |
| 650 nm | 1.48807 | 1.54705 |
| 700 nm | 1.48172 | 1.54523 |

FIG. 19 is a graph illustrating a result of the diffractive efficiency at the incidence angle of 0° (deg) evaluated by the RCWA calculation.

Figure 19A:
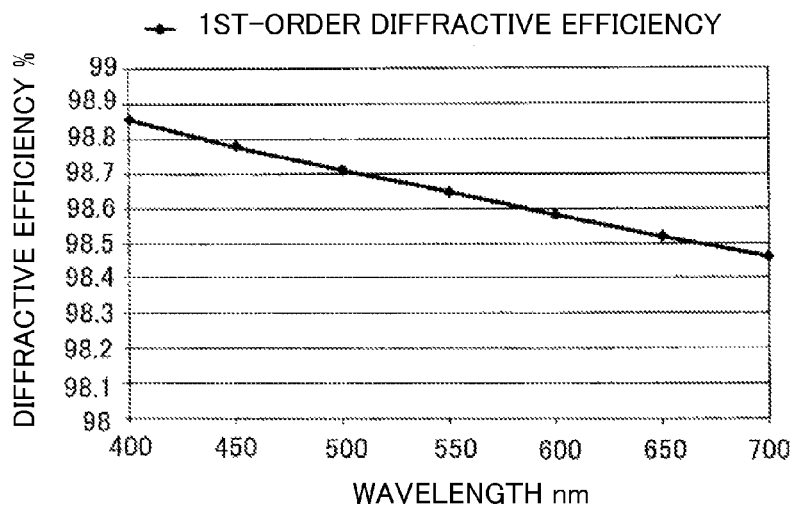
FIGS. 19A-19C are graphs of the diffractive efficiency of the diffractive optical element illustrated in FIG. 18.

FIG. 19A is a graph illustrating a wavelength characteristic of the diffractive efficiency of the +1st order diffracted light as the designed order. The abscissa axis denotes a wavelength (nm), and the ordinate axis denotes diffractive efficiency (%). The diffractive efficiency that considers the behavior of the wall surface section is lower on the long wavelength side, which means an unsuitable wavelength characteristic.

Figure 19B:
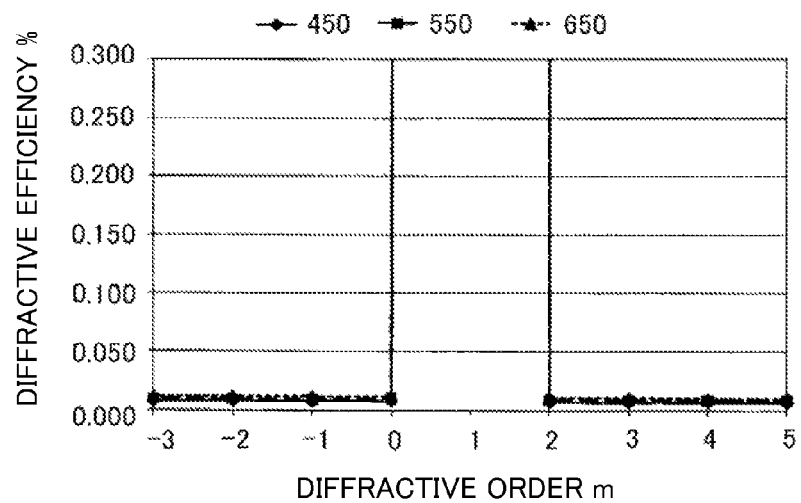

FIG. 19B is a graph of diffractive efficiency of low order diffracted light from −3rd order to +5th order for the wavelengths of 450 nm (black dot), 550 nm (black square), and 650 nm (black triangle), and illustrates the enlarged part of the low diffractive efficiency. The abscissa axis denotes the designed order (m), and the ordinate axis denotes the diffractive efficiency (%). The low order diffracted light is almost equivalent from 450 nm to 650 nm.

Figure 19C:
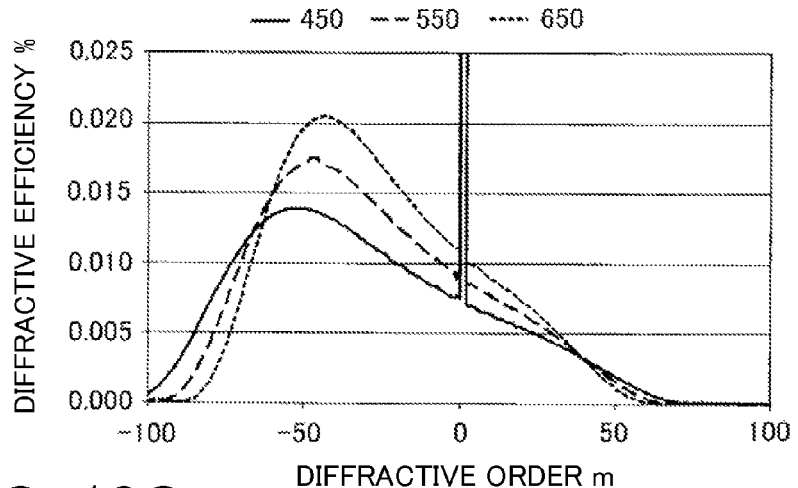

FIG. 19C is a graph of diffractive efficiency of high order diffracted light for the wavelengths of 450 nm (solid line), 550 nm (broken line), and 650 nm (dotted line), and illustrates the enlarged part of the low diffractive efficiency. The abscissa axis denotes the designed order (m), and the ordinate axis denotes the diffractive efficiency (%). Similar to the first embodiment, a peak of the diffractive efficiency of the unnecessary diffracted light from $-60^{th}$ order to $-40^{th}$ order for 650 nm is higher than that for 450 nm. The low order light is almost equivalent, and the high order light is more efficient on the long wavelength side. Thus, the diffractive efficiency of the designed order lowers on the long wavelength side.

Hence, it is understood that the DOE based upon the conventional scalar diffraction theory is undesirable when the grating wall surface is considered.

Second Embodiment

A second embodiment is different from the first embodiment in refractive index distribution and grating pitch of the first diffractive grating. The first diffractive grating 1 is made of UV curing resin in which ITO nanoparticles are mixed with acrylic fluorine UV curing resin, and has a refractive index distribution. The refractive index n11 of the base section 11 corresponds to the refractive index in which the ITO nanoparticles are mixed by 14.25%, and the refractive index n12 of the apex section 12 corresponds to the refractive index in which the ITO nanoparticles are mixed by 15.75%. The refractive index distribution linearly increases from the base section 11 to the apex section 12. The second diffractive grating 2 is made of UV curing resin in which $ZrO_2$ nanoparticles are uniformly mixed by 6% with the acrylic UV curing resin.

Table 4 illustrates numerical values of the refractive indices of the base sections and the apex sections of the first and second diffractive gratings 1 and 2. The grating height d is 11.02 μm, the designed order is +1st order, and the grating pitch is 200 μm.

TABLE 4

| | FIRST DIFFRACTIVE GRATING | | SECOND DIFFRACTIVE GRATING |
|---|---|---|---|
| WAVE-LENGTH | REFRACTIVE INDEX OF BASE SECTION n11 ITO-14.25% | REFRACTIVE INDEX OF APEX SECTION n12 ITO-15.75% | REFRACTIVE INDEX OF APEX SECTION n22 = REFRACTIVE INDEX OF BASE SECTION n21 $ZrO_2$-6% |
| 400 nm | 1.52870 | 1.53742 | 1.56975 |
| 450 nm | 1.51680 | 1.52485 | 1.56192 |
| 500 nm | 1.50709 | 1.51452 | 1.55631 |
| 550 nm | 1.49912 | 1.50601 | 1.55229 |
| 600 nm | 1.49204 | 1.49841 | 1.54932 |
| 650 nm | 1.48518 | 1.49103 | 1.54705 |
| 700 nm | 1.47814 | 1.48341 | 1.54523 |

FIG. 4 is a graph illustrating a result of the diffractive efficiency at the incidence angle of 0° (deg) evaluated by the RCWA calculation.

Figure 4A:
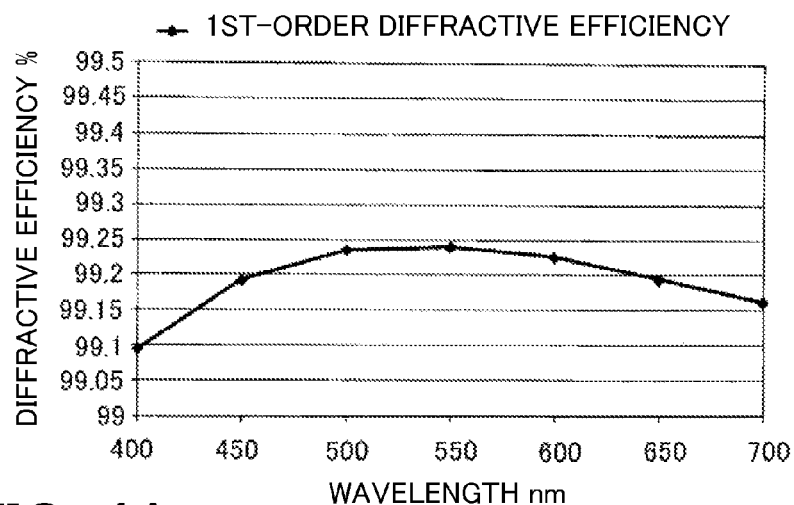
FIGS. 4A-4C are graphs of the diffractive efficiency of the diffractive optical element illustrated in FIG. 2 according to the second embodiment.

FIG. 4A is a graph illustrating the wavelength characteristic of the diffractive efficiency of the +1$^{st}$ order diffracted light as the designed order. The abscissa axis denotes a wavelength (nm), and the ordinate axis denotes diffractive efficiency (%). The diffractive efficiency that considers the behavior of the wall surface section is almost uniform in the visible wavelength range.

Figure 4B:
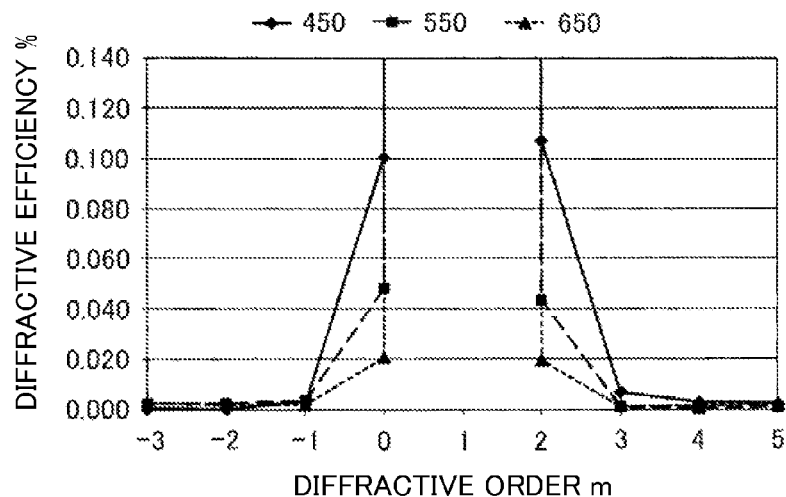

FIG. 4B is a graph of diffractive efficiency of low order diffracted light from −3rd order to +5th order for the wavelengths of 450 nm (black dot), 550 nm (black square), and 650 nm (black triangle), and illustrates the enlarged part of the low diffractive efficiency. The abscissa axis denotes the designed order (m), and the ordinate axis denotes the diffractive efficiency (%). The diffractive efficiency of the 0-th order light for 450 nm and the diffractive efficiency of the +2nd order diffracted light for 450 nm are higher than those for 650 nm.

Figure 4C:
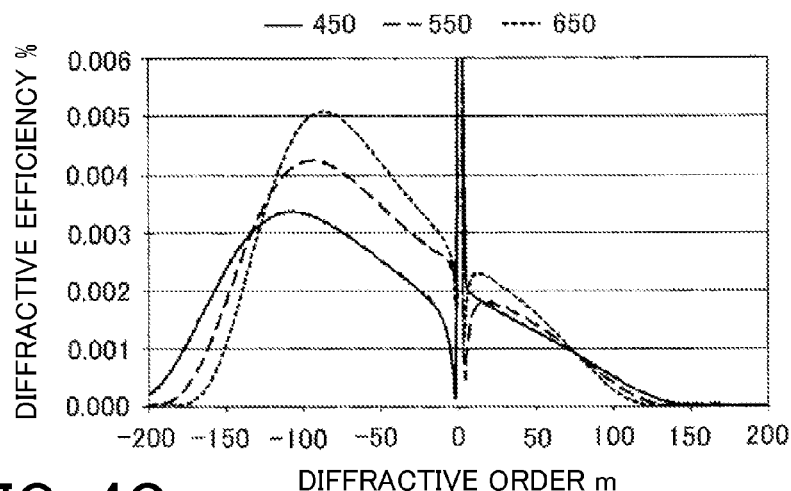

FIG. 4C is a graph of diffractive efficiency of high order diffracted light for the wavelengths of 450 nm (solid line), 550 nm (broken line), and 650 nm (dotted line), and illustrates the enlarged part of the low diffractive efficiency. The abscissa axis denotes the designed order (m), and the ordinate axis denotes the diffractive efficiency (%).

From FIG. 4C, a peak of the diffractive efficiency of the unnecessary diffracted light from −120$^{th}$ order to −80$^{th}$ order for 650 nm is higher than that for 450 nm. When this embodiment is compared with the first embodiment and Comparative example 1 having a narrower grating pitch, the peak of the diffractive efficiency is lower. This is because the diffraction phenomenon by the grating wall surface becomes less influential upon the overall grating due to a wide grating pitch. Thus, even when the grating pitch is different, the wavelength characteristic of the diffractive efficiency of the designed order is almost uniform when the unnecessary light of the high order light and the unnecessary light of the low order light are balanced.

Hence, even when the grating pitch is different, the effects of the present invention are obtained. Table 5 illustrates numerical values of ΔΦ1 ΔΦ2, ΔΦ1×ΔΦ2, ΔΦ1+ΔΦ2, and Φav according to the second embodiment:

TABLE 5

| WAVE-LENGTH | ΔΦ1 | ΔΦ2 | ΔΦ1 × ΔΦ2 | ΔΦ1 + ΔΦ2 | Φav |
|---|---|---|---|---|---|
| 400 nm | −0.1310 | 0.1091 | −0.0143 | −0.0219 | 1.0110 |
| 450 nm | −0.1051 | 0.0921 | −0.0097 | −0.0130 | 1.0065 |
| 500 nm | −0.0851 | 0.0788 | −0.0067 | −0.0064 | 1.0032 |
| 550 nm | −0.0655 | 0.0726 | −0.0048 | 0.0071 | 0.9965 |
| 600 nm | −0.0523 | 0.0648 | −0.0034 | 0.0125 | 0.9938 |
| 650 nm | −0.0490 | 0.0501 | −0.0025 | 0.0011 | 0.9994 |
| 700 nm | −0.0563 | 0.0266 | −0.0015 | −0.0297 | 1.0148 |

The second embodiment also satisfies the relationship illustrated in the first embodiment.

Comparative Example 2

Comparative example 2 is illustrated so as to further clarify the effect of this embodiment. Comparative example 2 has the same grating pitch as that of the second embodiment and is designed on the basis of the scalar diffraction theory. The scalar diffraction theory does not depend upon the grating pitch. The refractive index of the comparative example is the same as that illustrated in Table 3 of Comparative example 1. The grating height d is 11.02 μm, the designed order is +1st order, and the grating pitch is 200 μm.

FIG. 20 is a graph illustrating a result of the diffractive efficiency at the incidence angle of 0° (deg) evaluated by the RCWA calculation.

Figure 20A:
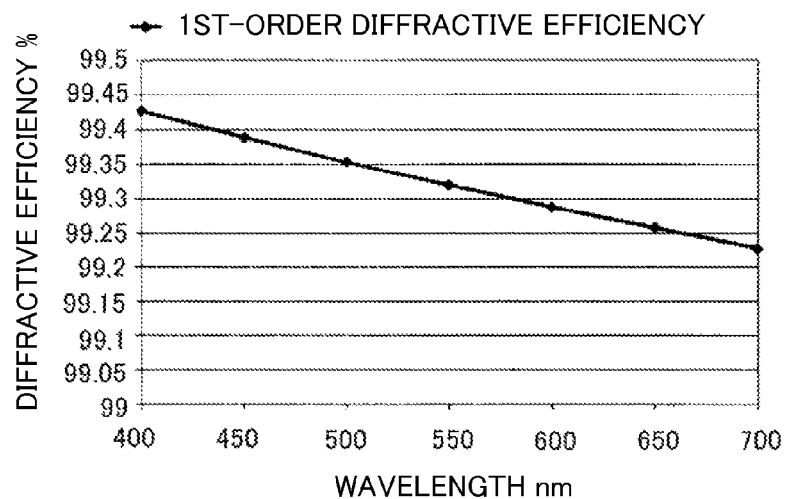
FIGS. 20A-20C are graphs of the diffractive efficiency of a diffractive optical element according to comparative example 2.

FIG. 20A is a graph illustrating a wavelength characteristic of the diffractive efficiency of the +1st order diffracted light as the designed order. The abscissa axis denotes a wavelength (nm), and the ordinate axis denotes diffractive efficiency (%). The diffractive efficiency that considers the behavior of the wall surface section is lower on the long wavelength side, which means an unsuitable wavelength characteristic.

Figure 20B:
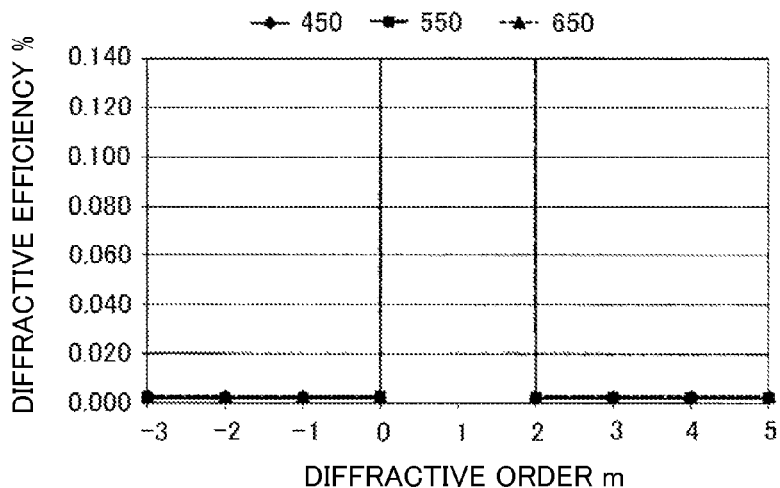

FIG. 20B is a graph of diffractive efficiency of low order diffracted light from −3rd order to +5th order for the wavelengths of 450 nm (black dot), 550 nm (black square), and 650 nm (black triangle), and illustrates the enlarged part of the low diffractive efficiency. The abscissa axis denotes the designed order (m), and the ordinate axis denotes the diffractive efficiency (%). The low order diffracted light is almost equivalent from 450 nm to 650 nm.

Figure 20C:
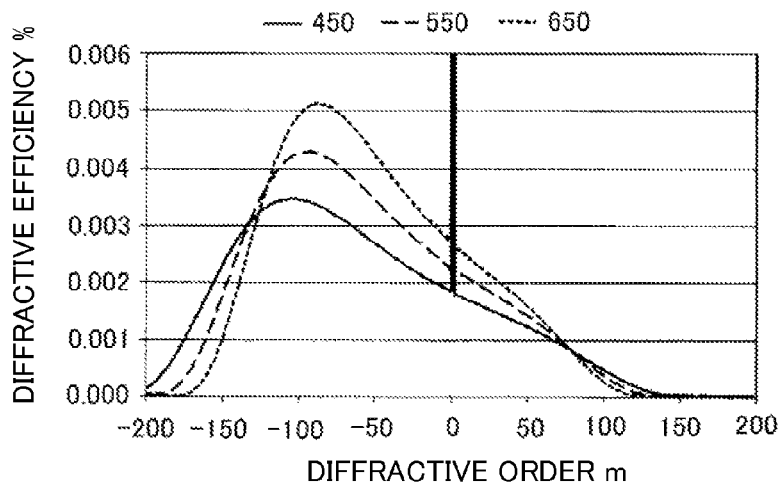

FIG. 20C is a graph of diffractive efficiency of high order diffracted light for the wavelengths of 450 nm (solid line), 550 nm (broken line), and 650 nm (dotted line), and illustrates the enlarged part of the low diffractive efficiency. The abscissa axis denotes the designed order (m), and the ordinate axis denotes the diffractive efficiency M. Similar to Comparative example 1, a peak of the diffractive efficiency of the unnecessary diffracted light from $-120^{th}$ order to $-80^{th}$ order for 650 nm is larger than that for 450 nm. When this embodiment is compared with Comparative example 1 having a narrower grating pitch, the diffractive efficiency of the peak is lower. This is because the diffraction phenomenon by the grating wall surface becomes less influential for the overall grating due to a wide grating pitch. Even when the grating pitch is different, similar to Comparative example 1, the low order light is almost equivalent, and the high order light is more efficient on the long wavelength side. Thus, the diffractive efficiency of the designed order lowers on the long wavelength side.

Hence, even when the grating pitch is different, it is understood that the DOE based on a conventional scalar diffraction theory is undesirable when the grating wall surface is considered.

Third Embodiment

Figure 5:
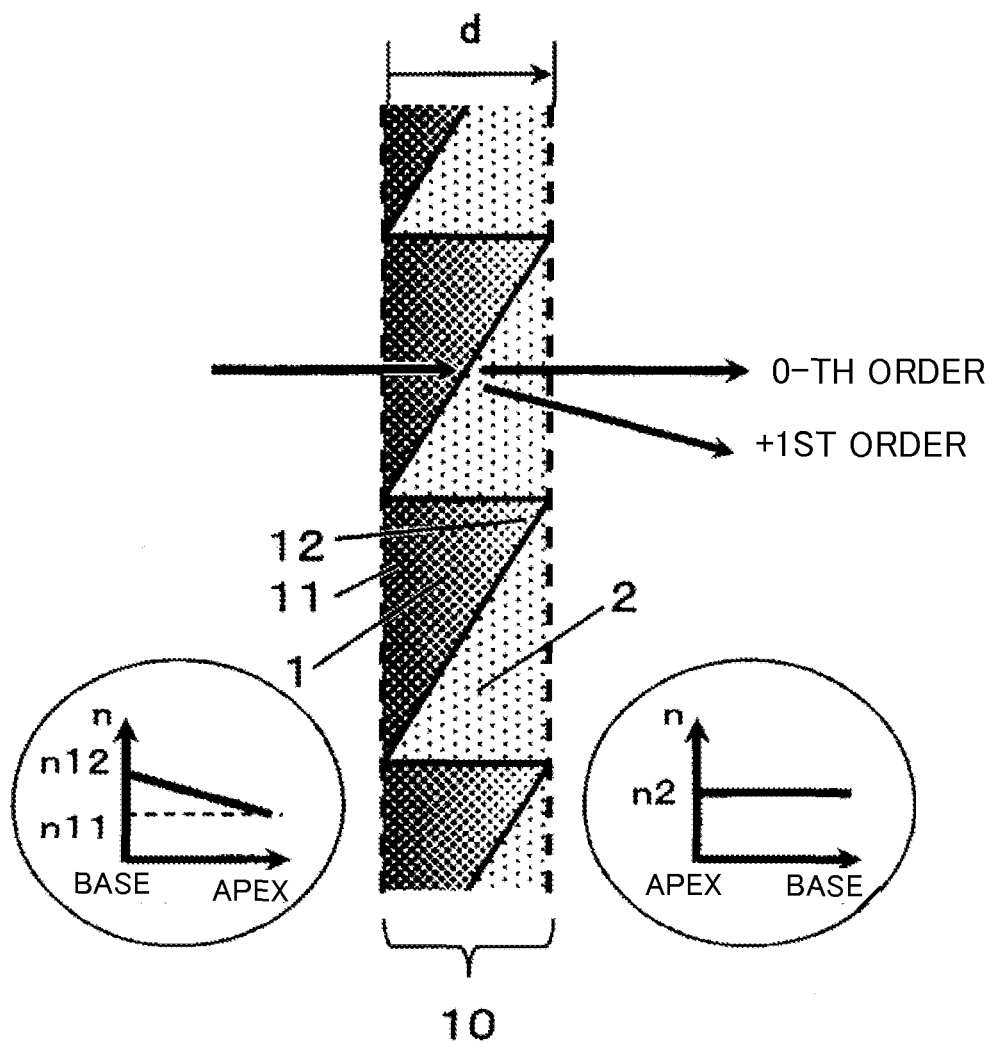
FIG. 5 is a partially enlarged sectional view of the diffractive optical element according to the third embodiment of the present invention.

A third embodiment is different from the first and second embodiments in slope direction of a refractive index distribution of the first diffractive grating. FIG. 5 is a partially enlarged sectional view of the DOE 10 taken along the A-A' line illustrated in FIG. 1 according to the third embodiment.

As illustrated in FIG. 5, the first diffractive grating 1 of this embodiment is made of UV curing resin in which ITO nanoparticles are mixed with acrylic fluorine UV curing resin, and has a refractive index distribution. The refractive index n11 of the base section 11 corresponds to the refractive index in which the ITO nanoparticles are mixed by 15.75%, and the refractive index n12 of the apex section 12 corresponds to the refractive index in which the ITO nanoparticles are mixed by 14.25%. The refractive index distribution linearly decreases from the base section 11 to the apex section 12. The second diffractive grating 2 is made of UV curing resin in which ZrO2 nanoparticles are uniformly mixed by 6% with the acrylic UV curing resin.

Table 6 illustrates numerical values of the refractive indices of the base sections and the apex sections of the first and second diffractive gratings 1 and 2. The grating height d is 11.02 μm, the designed order is +1st order, and the grating pitch is 100 μm.

TABLE 6

| WAVE-LENGTH | FIRST DIFFRACTIVE GRATING | | SECOND DIFFRACTIVE GRATING |
|---|---|---|---|
| | REFRACTIVE INDEX OF BASE SECTION n11 ITO-15.75% | REFRACTIVE INDEX OF APEX SECTION n12 ITO-14.25% | REFRACTIVE INDEX OF APEX SECTION n22 = REFRACTIVE INDEX OF BASE SECTION n21 $ZrO_2$-6% |
| 400 nm | 1.53742 | 1.52870 | 1.56975 |
| 450 nm | 1.52485 | 1.51680 | 1.56192 |
| 500 nm | 1.51452 | 1.50709 | 1.55631 |
| 550 nm | 1.50601 | 1.49912 | 1.55229 |
| 600 nm | 1.49841 | 1.49204 | 1.54932 |
| 650 nm | 1.49103 | 1.48518 | 1.54705 |
| 700 nm | 1.48341 | 1.47814 | 1.54523 |

Figure 6A:
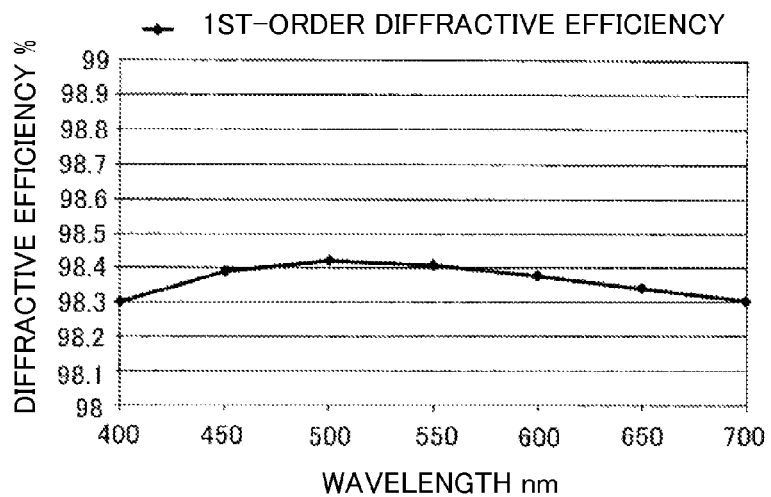
FIGS. 6A-6C are graphs of the diffractive efficiency of the diffractive optical element illustrated in FIG. 5 according to the third embodiment.
Figure 6B:
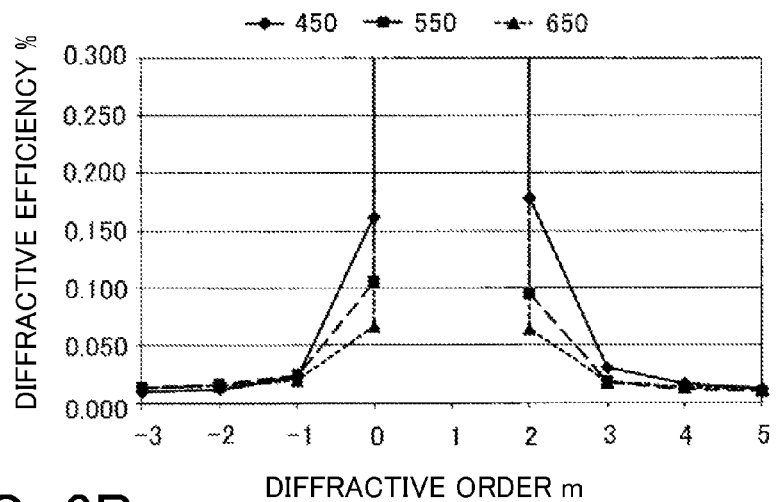
Figure 6C:
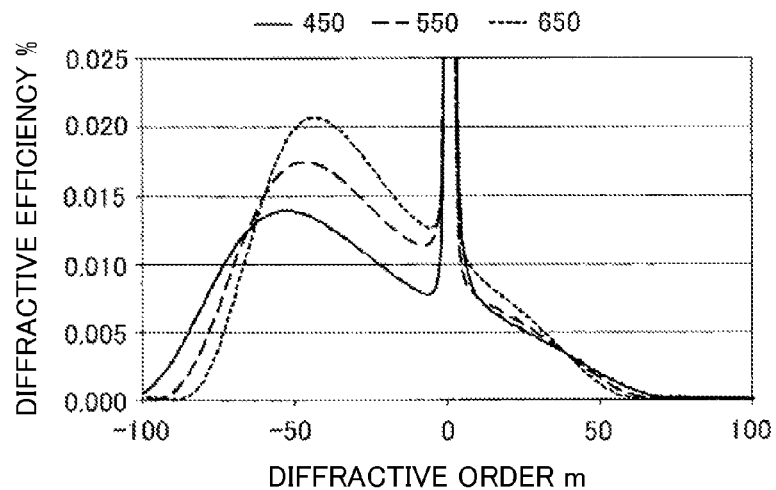

FIG. 6 is a graph illustrating a result of the diffractive efficiency at the incidence angle of 0° (deg) evaluated by the RCWA calculation, and corresponds to FIGS. 3 and 4. Similar to the first and second embodiments, the wavelength characteristic of the diffractive efficiency of the designed order is almost uniform when the unnecessary light of the high order light and the unnecessary light of the low order light are balanced. It is understood that even when the slope direction of the refractive index distribution of the diffractive grating is opposite to that of the first and second embodiments, the effects of the present invention can be obtained.

Table 7 illustrates numerical values of $\Delta\Phi1$ $\Delta\Phi2$, $\Delta\Phi1\times\Delta\Phi2$, $\Delta\Phi1+\Delta\Phi2$, and $\Phi av$ according to the third embodiment:

TABLE 7

| WAVE-LENGTH | $\Delta\Phi1$ | $\Delta\Phi2$ | $\Delta\Phi1 \times \Delta\Phi2$ | $\Delta\Phi1 + \Delta\Phi2$ | $\Phi av$ |
|---|---|---|---|---|---|
| 400 nm | 0.1091 | -0.1310 | -0.0143 | -0.0219 | 1.0110 |
| 450 nm | 0.0921 | -0.1051 | -0.0097 | -0.0130 | 1.0065 |
| 500 nm | 0.0788 | -0.0851 | -0.0067 | -0.0064 | 1.0032 |
| 550 nm | 0.0726 | -0.0655 | -0.0048 | 0.0071 | 0.9965 |
| 600 nm | 0.0648 | -0.0523 | -0.0034 | 0.0125 | 0.9938 |
| 650 nm | 0.0501 | -0.0490 | -0.0025 | 0.0011 | 0.9994 |
| 700 nm | 0.0266 | -0.0563 | -0.0015 | -0.0297 | 1.0148 |

The third embodiment also satisfies the relationship illustrated in the first embodiment.

Fourth Embodiment

Figure 7:
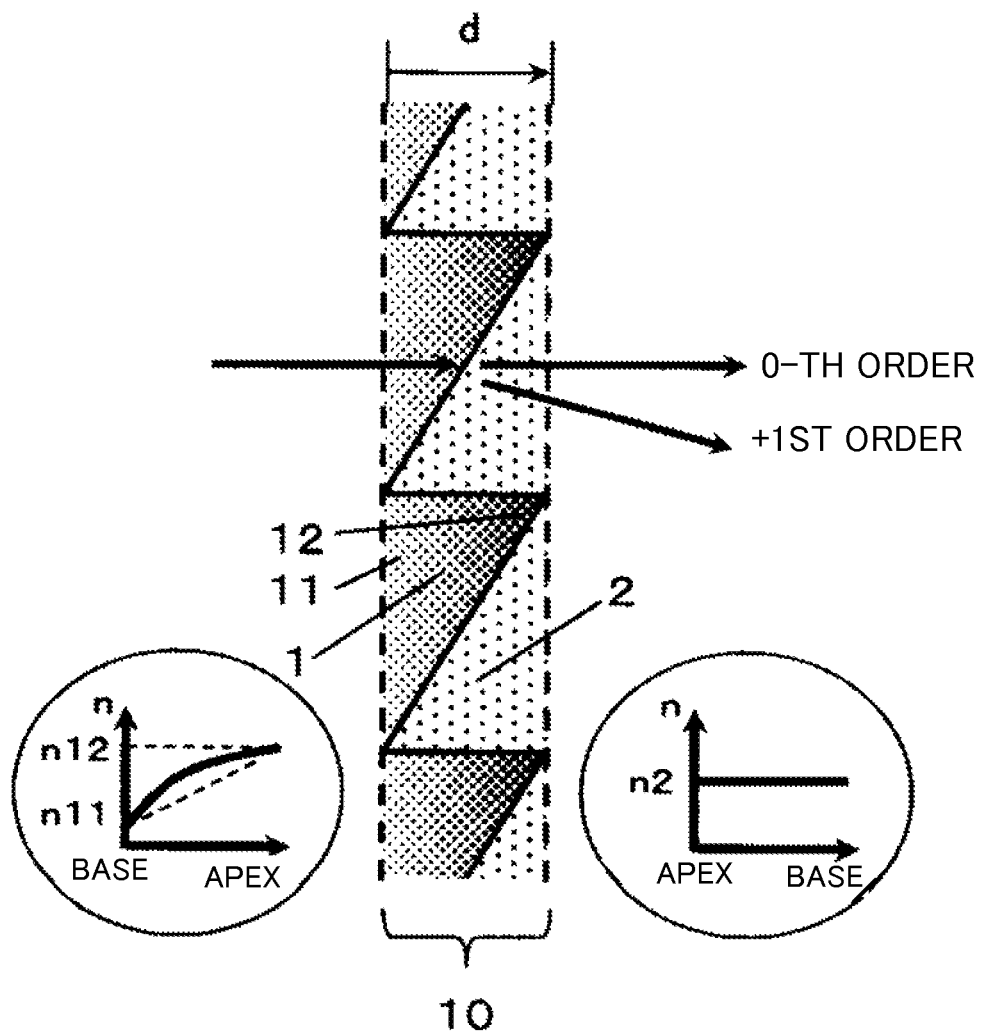
FIG. 7 is a partially enlarged sectional view of the diffractive optical element according to the fourth embodiment of the present invention.

A fourth embodiment is different from the first and second embodiments in that the refractive index distribution of the first diffractive grating is nonlinear. FIG. 7 is a partially enlarged sectional view of the DOE 10 taken along the A-A' line illustrated in FIG. 1 according to the fourth embodiment.

As illustrated in FIG. 7, the first diffractive grating 1 of this embodiment is made of UV curing resin in which ITO nanoparticles are mixed with acrylic fluorine UV curing resin, and has a refractive index distribution. The refractive index n11 of the base section 11 corresponds to the refractive index in which the ITO nanoparticles are mixed by 14.40%, and the refractive index n12 of the apex section 12 corresponds to the refractive index in which the ITO nanoparticles are mixed by 15.60%. As illustrated in a lower left graph in FIG. 7, the refractive index distribution is convex upward which increases from the base section 11 to the apex section 12. The second diffractive grating 2 of this embodiment is made of UV curing resin in which $ZrO_2$ nanoparticles are uniformly mixed by 6% with the acrylic UV curing resin.

Table 8 illustrates numerical values of the refractive indices of the base sections and the apex sections of the first and second diffractive gratings 1 and 2. The grating height d is 11.02 μm, the designed order is +1st order, and the grating pitch is 100 μm.

TABLE 8

| WAVE-LENGTH | FIRST DIFFRACTIVE GRATING | | SECOND DIFFRACTIVE GRATING |
|---|---|---|---|
| | REFRACTIVE INDEX OF BASE SECTION n11 ITO-14.4% | REFRACTIVE INDEX OF APEX SECTION n12 ITO-15.6% | REFRACTIVE INDEX OF APEX SECTION n22 = REFRACTIVE INDEX OF BASE SECTION n21 $ZrO_2$-6% |
| 400 nm | 1.52958 | 1.53655 | 1.56975 |
| 450 nm | 1.51761 | 1.52405 | 1.56192 |
| 500 nm | 1.50783 | 1.51378 | 1.55631 |
| 550 nm | 1.49981 | 1.50532 | 1.55229 |
| 600 nm | 1.49267 | 1.49778 | 1.54932 |

TABLE 8-continued

|  | FIRST DIFFRACTIVE GRATING | | SECOND DIFFRACTIVE GRATING |
| --- | --- | --- | --- |
| WAVE-LENGTH | REFRACTIVE INDEX OF BASE SECTION n11 ITO-14.4% | REFRACTIVE INDEX OF APEX SECTION n12 ITO-15.6% | REFRACTIVE INDEX OF APEX SECTION n22 = REFRACTIVE INDEX OF BASE SECTION n21 ZrO$_2$-6% |
| 650 nm | 1.48577 | 1.49044 | 1.54705 |
| 700 nm | 1.47867 | 1.48288 | 1.54523 |

Figure 8A:
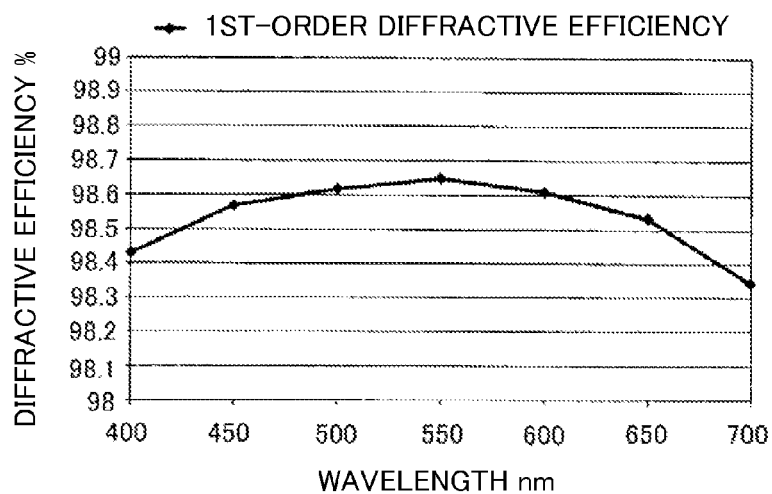
FIGS. 8A-8C are graphs of the diffractive efficiency of the diffractive optical element illustrated in FIG. 7 according to the fourth embodiment.
Figure 8B:
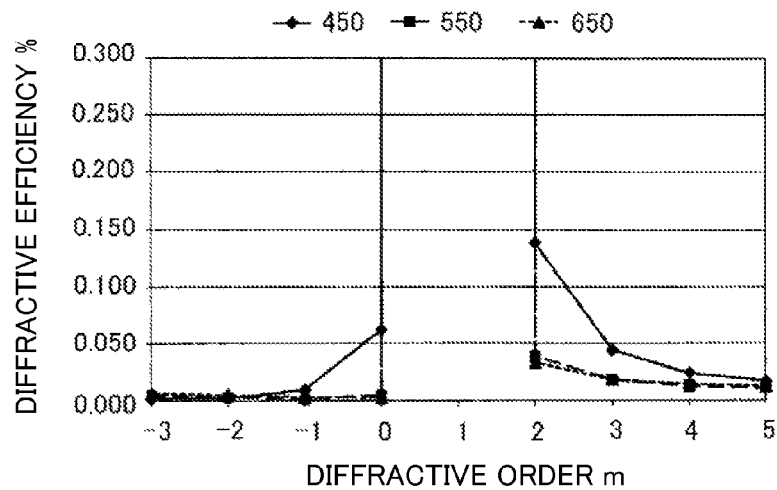
Figure 8C:
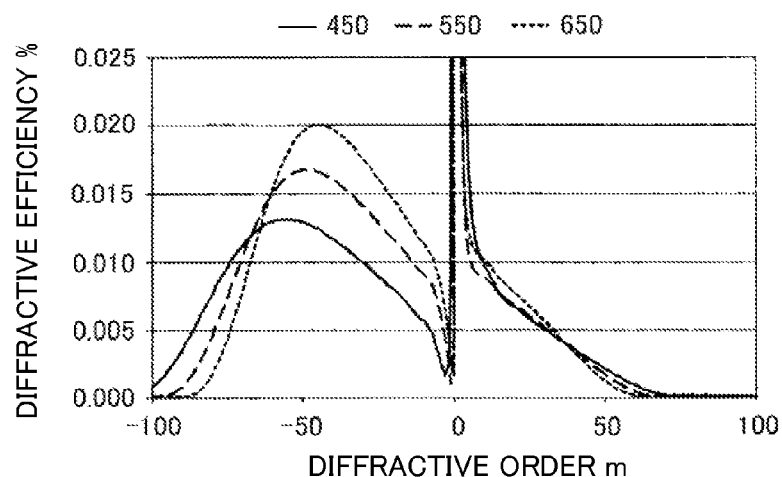

FIG. 8 is a graph illustrating a result of the diffractive efficiency at the incidence angle of 0° (deg) evaluated by the RCWA calculation, and corresponds to FIGS. 3 and 4. Similar to the first to third embodiments, the wavelength characteristic of the diffractive efficiency of the designed order is almost uniform when the unnecessary light of the high order light and the unnecessary light of the low order light are balanced. It is understood that even when the refractive index distribution of the diffractive grating is nonlinear unlike the first to third embodiments, the effects of the present invention can be obtained.

Table 9 illustrates numerical values of $\Delta\Phi1$ $\Delta\Phi2$, $\Delta\Phi1 \times \Delta\Phi2$, $\Delta\Phi1+\Delta\Phi2$, and $\Phi$av according to the fourth embodiment:

TABLE 9

| WAVE-LENGTH | $\Delta\Phi1$ | $\Delta\Phi2$ | $\Delta\Phi1 \times \Delta\Phi2$ | $\Delta\Phi1 + \Delta\Phi2$ | $\Phi$av |
| --- | --- | --- | --- | --- | --- |
| 400 nm | −0.1070 | 0.0852 | −0.0091 | −0.0218 | 1.0109 |
| 450 nm | −0.0854 | 0.0724 | −0.0062 | −0.0129 | 1.0065 |
| 500 nm | −0.0687 | 0.0624 | −0.0043 | −0.0063 | 1.0032 |
| 550 nm | −0.0517 | 0.0588 | −0.0030 | 0.0071 | 0.9964 |
| 600 nm | −0.0406 | 0.0531 | −0.0022 | 0.0125 | 0.9937 |
| 650 nm | −0.0390 | 0.0402 | −0.0016 | 0.0012 | 0.9994 |
| 700 nm | −0.0480 | 0.0183 | −0.0009 | −0.0296 | 1.0148 |

The fourth embodiment also satisfies the relationship illustrated in the first embodiment.

Fifth Embodiment

Figure 9:
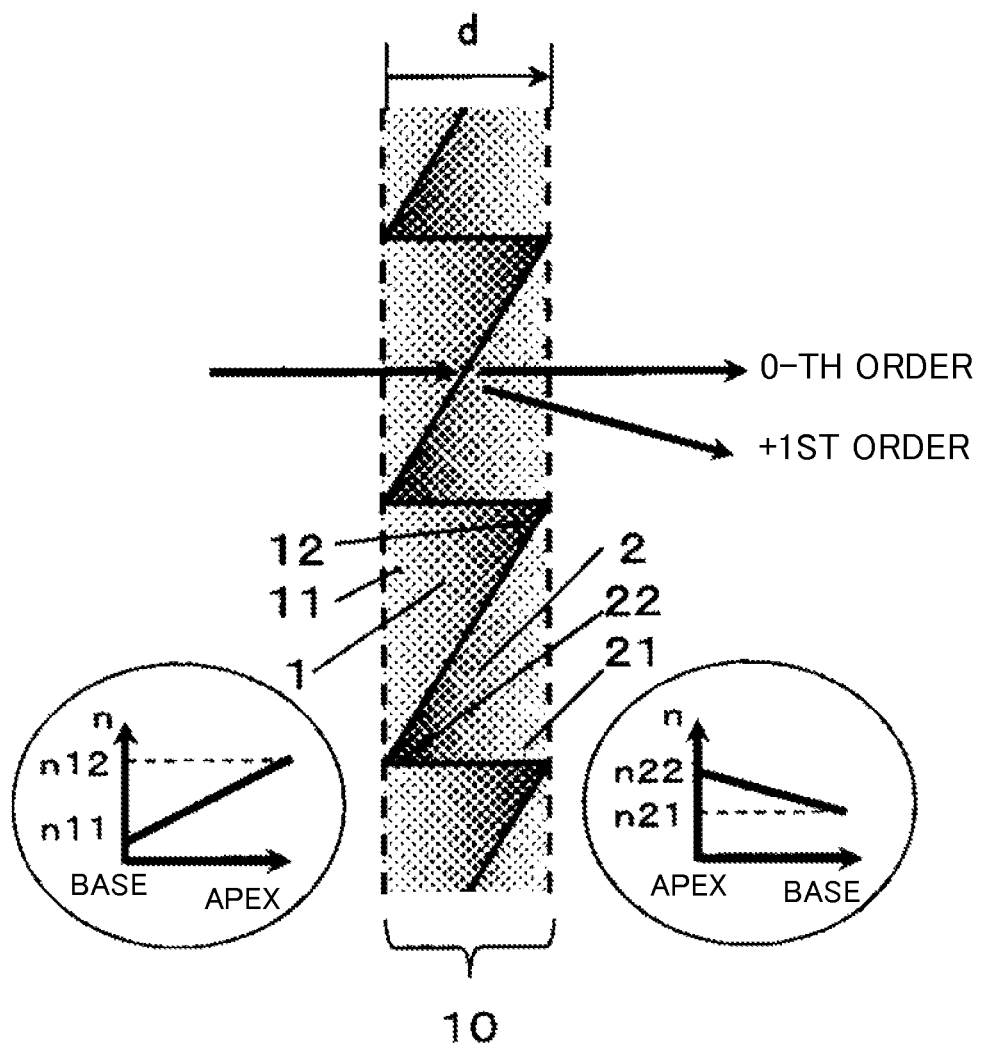
FIG. 9 is a partially enlarged sectional view of the diffractive optical element according to the fifth embodiment of the present invention.

According to a fifth embodiment, both the first and second diffractive gratings have refractive index distributions. FIG. 9 is a partially enlarged sectional view of the DOE 10 taken along the A-A' line illustrated in FIG. 1 according to the fifth embodiment.

As illustrated in FIG. 9, the first diffractive grating 1 of this embodiment is made of UV curing resin in which ITO nanoparticles are mixed with acrylic fluorine UV curing resin, and has a refractive index distribution. The refractive index n11 of the base section 11 corresponds to the refractive index in which the ITO nanoparticles are mixed by 14.40%, and the refractive index n12 of the apex section 12 corresponds to the refractive index in which the ITO nanoparticles are mixed by 15.60%. The refractive index distribution linearly increases from the base section 11 to the apex section 12.

The second diffractive grating 2 of this embodiment is made of UV curing resin in which ZrO$_2$ nanoparticles are mixed with the acrylic UV curing resin. The refractive index n22 of the apex section 22 corresponds to the refractive index in which the ZrO$_2$ nanoparticles are mixed by 6.3%, and the refractive index n21 of the base section 21 corresponds to the refractive index in which the ZrO$_2$ nanoparticles are mixed by 5.7%. The refractive index distribution linearly decreases from the apex section 22 to the base section 21.

Table 10 illustrates numerical values of the refractive indices of the base sections and the apex sections of the first and second diffractive gratings 1 and 2. The grating height d is 11.02 μm, the designed order is +1st order, and the grating pitch is 100 μm.

TABLE 10

|  | FIRST DIFFRACTIVE GRATING | | SECOND DIFFRACTIVE GRATING | |
| --- | --- | --- | --- | --- |
| WAVELENGTH | REFRACTIVE INDEX OF BASE SECTION n11 ITO-14.4% | REFRACTIVE INDEX OF APEX SECTION n12 ITO-15.6% | REFRACTIVE INDEX OF APEX SECTION n22 ZrO$_2$-6.3% | REFRACTIVE INDEX OF BASE SECTION n21 ZrO$_2$-5.7% |
| 400 nm | 1.52870 | 1.53742 | 1.57109 | 1.56841 |
| 450 nm | 1.51680 | 1.52485 | 1.56324 | 1.56060 |
| 500 nm | 1.50709 | 1.51452 | 1.55761 | 1.55501 |
| 550 nm | 1.49912 | 1.50601 | 1.55358 | 1.55100 |
| 600 nm | 1.49204 | 1.49841 | 1.55060 | 1.54804 |
| 650 nm | 1.48518 | 1.49103 | 1.54832 | 1.54577 |
| 700 nm | 1.47814 | 1.48341 | 1.54649 | 1.54396 |

Figure 10A:
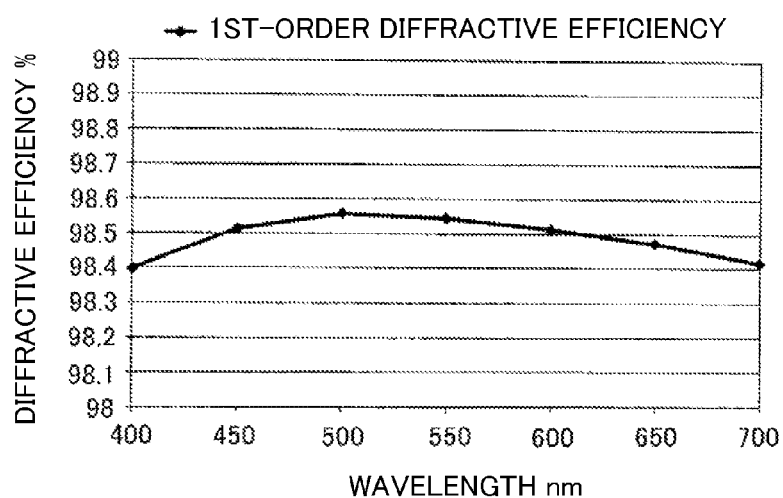
FIGS. 10A-10C are graphs of the diffractive efficiency of the diffractive optical element illustrated in FIG. 9 according to the fifth embodiment.
Figure 10B:
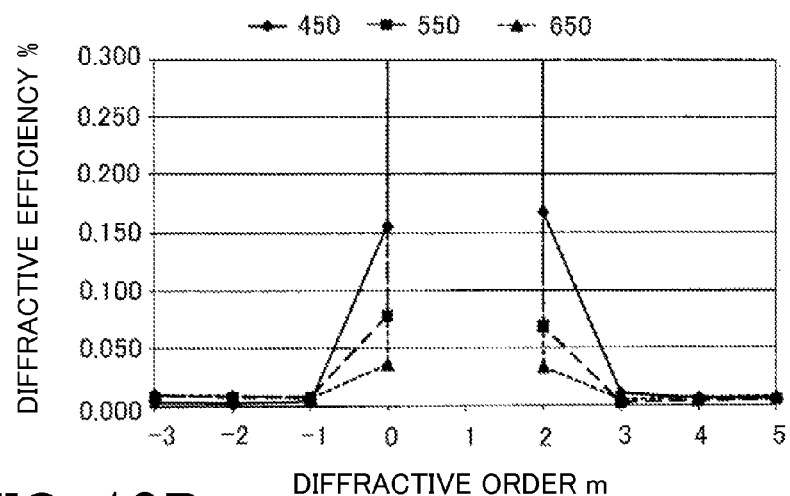
Figure 10C:
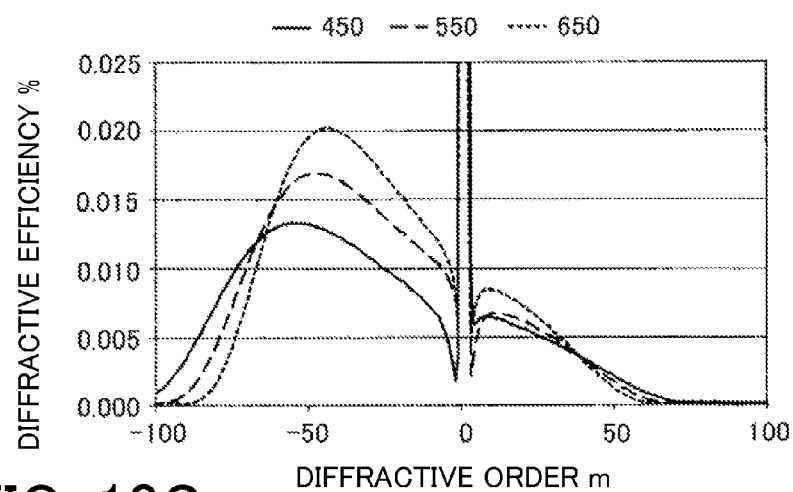

FIG. 10 is a graph illustrating a result of the diffractive efficiency at the incidence angle of 0° (deg) evaluated by the RCWA calculation, and corresponds to FIGS. 3 and 4. Similar to the first to fourth embodiments, the wavelength characteristic of the diffractive efficiency of the designed order is almost uniform when the unnecessary light of the high order light and the unnecessary light of the low order light are balanced. It is understood that even when both diffractive grating instead of a single diffractive grating have refractive index distributions unlike the first to fourth embodiments, the effect of the present invention can be obtained.

Table 11 illustrates numerical values of $\Delta\Phi1$ $\Delta\Phi2$, $\Delta\Phi1 \times \Delta\Phi2$, $\Delta\Phi1+\Delta\Phi2$, and $\Phi$av according to the fifth embodiment.

TABLE 11

| WAVE-LENGTH | $\Delta\Phi1$ | $\Delta\Phi2$ | $\Delta\Phi1 \times \Delta\Phi2$ | $\Delta\Phi1 + \Delta\Phi2$ | $\Phi$av |
| --- | --- | --- | --- | --- | --- |
| 400 nm | −0.1680 | 0.1461 | −0.0245 | −0.0219 | 1.0109 |
| 450 nm | −0.1375 | 0.1245 | −0.0171 | −0.0130 | 1.0065 |
| 500 nm | −0.1138 | 0.1075 | −0.0122 | −0.0064 | 1.0032 |
| 550 nm | −0.0913 | 0.0984 | −0.0090 | 0.0071 | 0.9965 |
| 600 nm | −0.0758 | 0.0883 | −0.0067 | 0.0125 | 0.9937 |
| 650 nm | −0.0705 | 0.0717 | −0.0051 | 0.0012 | 0.9994 |
| 700 nm | −0.0762 | 0.0465 | −0.0035 | −0.0296 | 1.0148 |

The fifth embodiment also satisfies the relationship illustrated in the first embodiment.

Sixth Embodiment

Figure 11:
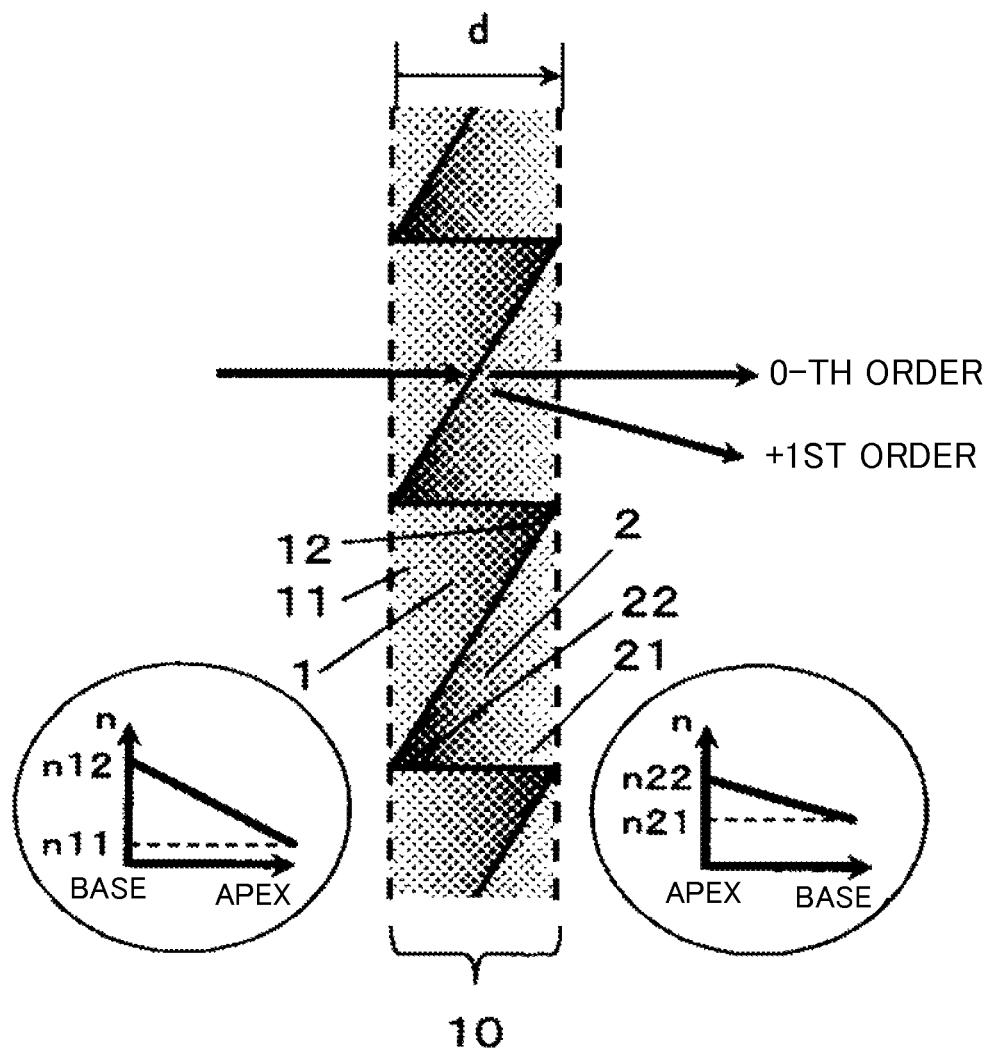
FIG. 11 is a partially enlarged sectional view of the diffractive optical element according to the sixth embodiment of the present invention.
Figure 12A:
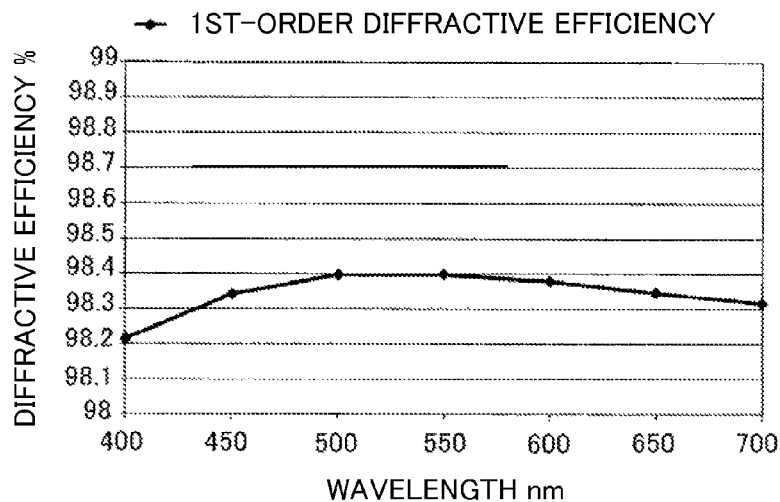
FIGS. 12A-12C are graphs of the diffractive efficiency of the diffractive optical element illustrated in FIG. 11 according to the sixth embodiment.
Figure 12B:
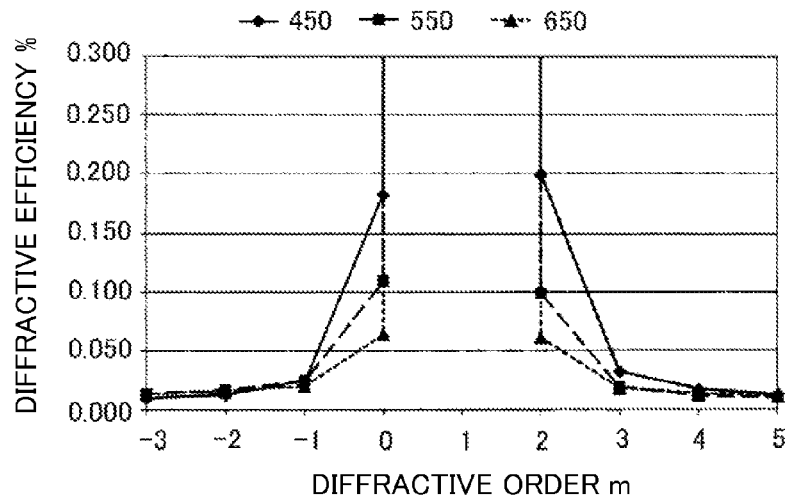
Figure 12C:
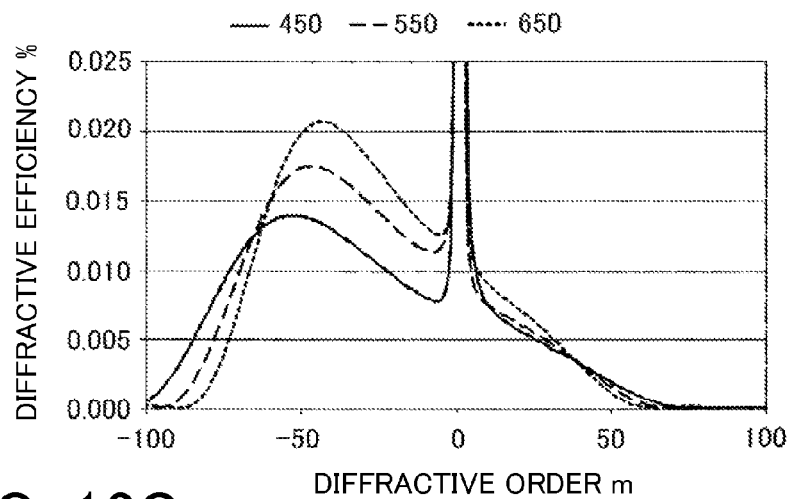

The sixth embodiment is different from the fifth embodiment in slope direction of the refractive index distribution of the first diffractive grating. FIG. 11 is a partially enlarged sectional view of the DOE 10 taken along the A-A' line illustrated in FIG. 1 according to the sixth embodiment. Table 12 illustrates each refractive index. FIG. 12 illustrates a result evaluated by the RCWA calculation. Table 13 illustrates numerical values of $\Delta\Phi1$ $\Delta\Phi2$, $\Delta\Phi1 \times \Delta\Phi2$, $\Delta\Phi1+\Delta\Phi2$, and $\Phi av$:

TABLE 12

|  | FIRST DIFFRACTIVE GRATING | | SECOND DIFFRACTIVE GRATING | |
| --- | --- | --- | --- | --- |
| WAVELENGTH | REFRACTIVE INDEX OF BASE SECTION n11 ITO-16.05% | REFRACTIVE INDEX OF APEX SECTION n12 ITO-13.95% | REFRACTIVE INDEX OF APEX SECTION n22 $ZrO_2$-6.3% | REFRACTIVE INDEX OF BASE SECTION n21 $ZrO_2$-5.7% |
| 400 nm | 1.53916 | 1.52696 | 1.57109 | 1.56841 |
| 450 nm | 1.52646 | 1.51519 | 1.56324 | 1.56060 |
| 500 nm | 1.51600 | 1.50560 | 1.55761 | 1.55501 |
| 550 nm | 1.50739 | 1.49774 | 1.55358 | 1.55100 |
| 600 nm | 1.49968 | 1.49076 | 1.55060 | 1.54804 |
| 650 nm | 1.49219 | 1.48401 | 1.54832 | 1.54577 |
| 700 nm | 1.48446 | 1.47709 | 1.54649 | 1.54396 |

TABLE 13

| WAVELENGTH | $\Delta\Phi1$ | $\Delta\Phi2$ | $\Delta\Phi1 \times \Delta\Phi2$ | $\Delta\Phi1 + \Delta\Phi2$ | $\Phi av$ |
| --- | --- | --- | --- | --- | --- |
| 400 nm | 0.1201 | −0.1423 | −0.0171 | −0.0222 | 1.0111 |
| 450 nm | 0.0990 | −0.1123 | −0.0111 | −0.0133 | 1.0066 |
| 500 nm | 0.0828 | −0.0893 | −0.0074 | −0.0065 | 1.0033 |
| 550 nm | 0.0744 | −0.0674 | −0.0050 | 0.0069 | 0.9965 |
| 600 nm | 0.0647 | −0.0523 | −0.0034 | 0.0124 | 0.9938 |
| 650 nm | 0.0483 | −0.0473 | −0.0023 | 0.0011 | 0.9995 |
| 700 nm | 0.0233 | −0.0530 | −0.0012 | −0.0297 | 1.0149 |

Seventh Embodiment

Figure 13:
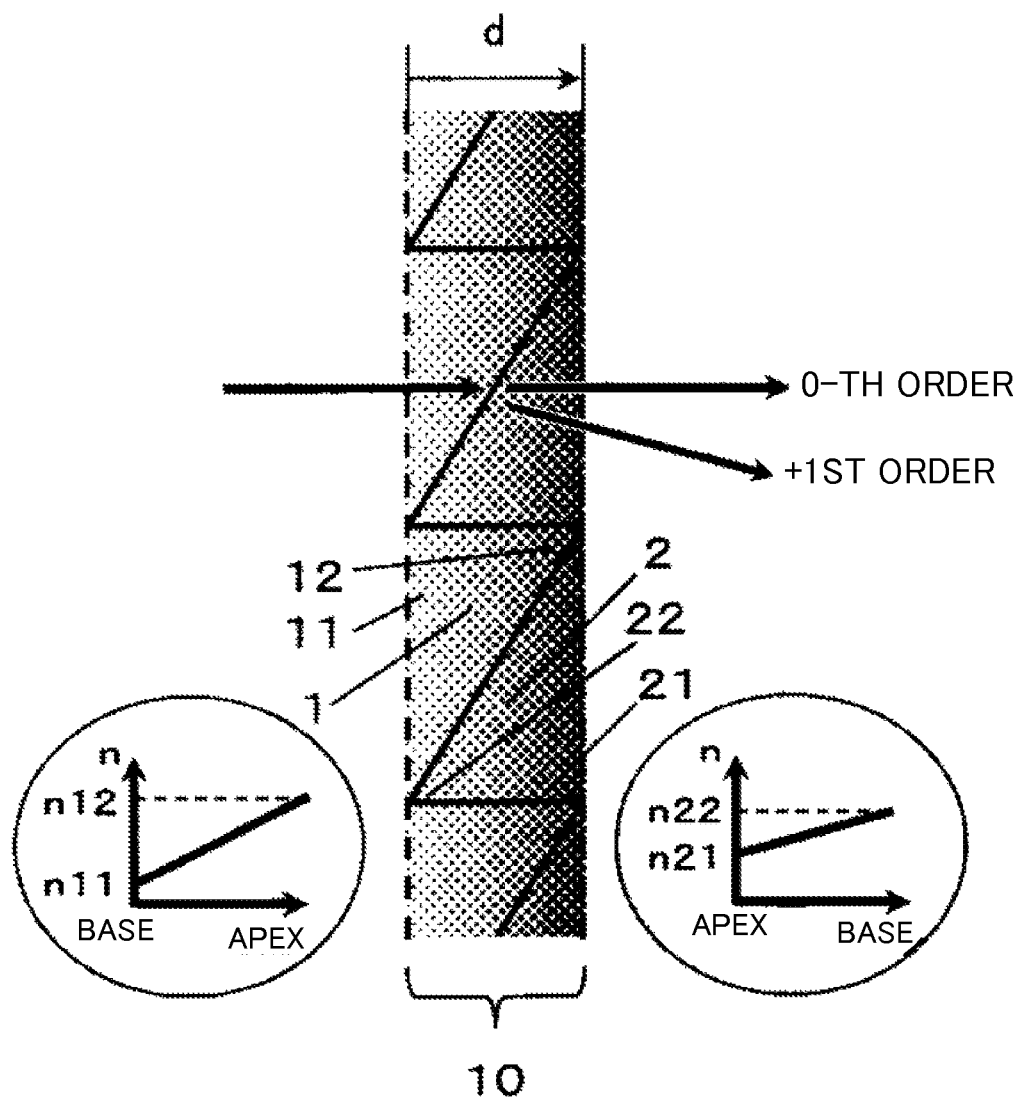
FIG. 13 is a partially enlarged sectional view of the diffractive optical element according to the seventh embodiment of the present invention.
Figure 14A:
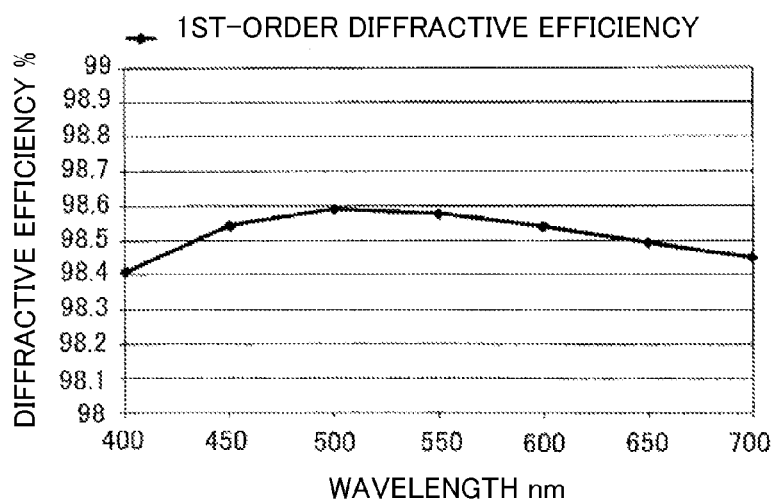
FIGS. 14A-14C are graphs of the diffractive efficiency of the diffractive optical element illustrated in FIG. 13 according to the seventh embodiment.
Figure 14B:
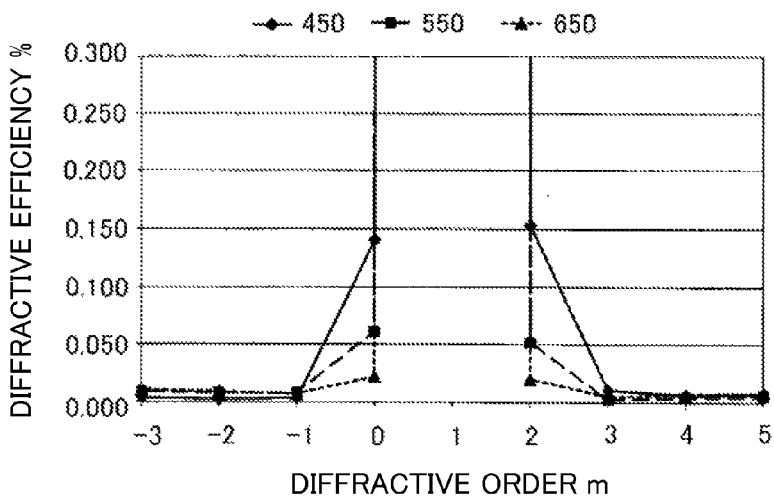
Figure 14C:
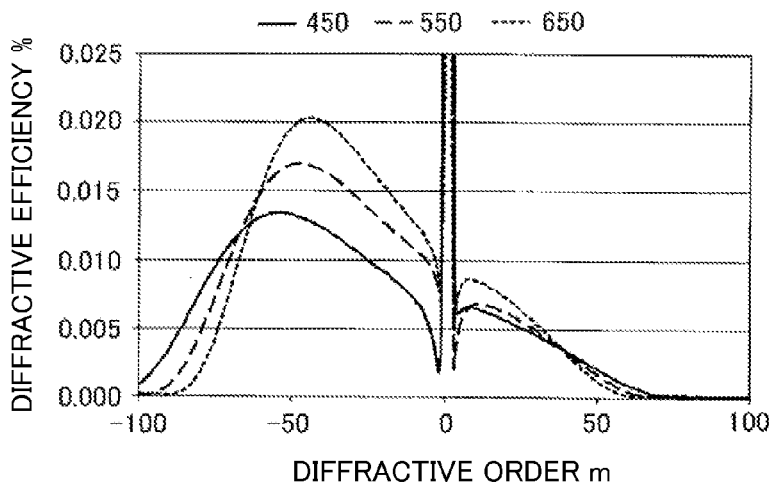

A seventh embodiment is different from the fifth and sixth embodiments in slope direction of the refractive index distribution of the first diffractive grating. FIG. 13 is a partially enlarged sectional view of the DOE 10 taken along the A-A' line illustrated in FIG. 1 according to the seventh embodiment. Table 14 illustrates each refractive index. FIG. 14 illustrates a result evaluated by the RCWA calculation. Table 15 illustrates numerical values of $\Delta\Phi1$ $\Delta\Phi2$, $\Delta\Phi1 \times \Delta\Phi2$, $\Delta\Phi1+\Delta\Phi2$, and $\Phi av$:

TABLE 14

|  | FIRST DIFFRACTIVE GRATING | | SECOND DIFFRACTIVE GRATING | |
| --- | --- | --- | --- | --- |
| WAVELENGTH | REFRACTIVE INDEX OF BASE SECTION n11 ITO-13.8% | REFRACTIVE INDEX OF APEX SECTION n12 ITO-16.2% | REFRACTIVE INDEX OF APEX SECTION n22 $ZrO_2$-5.7% | REFRACTIVE INDEX OF BASE SECTION n21 $ZrO_2$-6.3% |
| 400 nm | 1.52608 | 1.54003 | 1.56841 | 1.57109 |
| 450 nm | 1.51438 | 1.52726 | 1.56060 | 1.56324 |
| 500 nm | 1.50485 | 1.51675 | 1.55501 | 1.55761 |
| 550 nm | 1.49705 | 1.50807 | 1.55100 | 1.55358 |
| 600 nm | 1.49012 | 1.50032 | 1.54804 | 1.55060 |
| 650 nm | 1.48343 | 1.49278 | 1.54577 | 1.54832 |
| 700 nm | 1.47656 | 1.48498 | 1.54396 | 1.54649 |

TABLE 15

| WAVELENGTH | $\Delta\Phi1$ | $\Delta\Phi2$ | $\Delta\Phi1 \times \Delta\Phi2$ | $\Delta\Phi1 + \Delta\Phi2$ | $\Phi av$ |
| --- | --- | --- | --- | --- | --- |
| 400 nm | −0.1664 | 0.1440 | −0.0240 | −0.0224 | 1.0112 |
| 450 nm | −0.1321 | 0.1187 | −0.0157 | −0.0134 | 1.0067 |
| 500 nm | −0.1058 | 0.0991 | −0.0105 | −0.0067 | 1.0033 |
| 550 nm | −0.0813 | 0.0881 | −0.0072 | 0.0068 | 0.9966 |
| 600 nm | −0.0641 | 0.0764 | −0.0049 | 0.0123 | 0.9938 |
| 650 nm | −0.0572 | 0.0582 | −0.0033 | 0.0010 | 0.9995 |
| 700 nm | −0.0613 | 0.0316 | −0.0019 | −0.0298 | 1.0149 |

Eighth Embodiment

Figure 15:
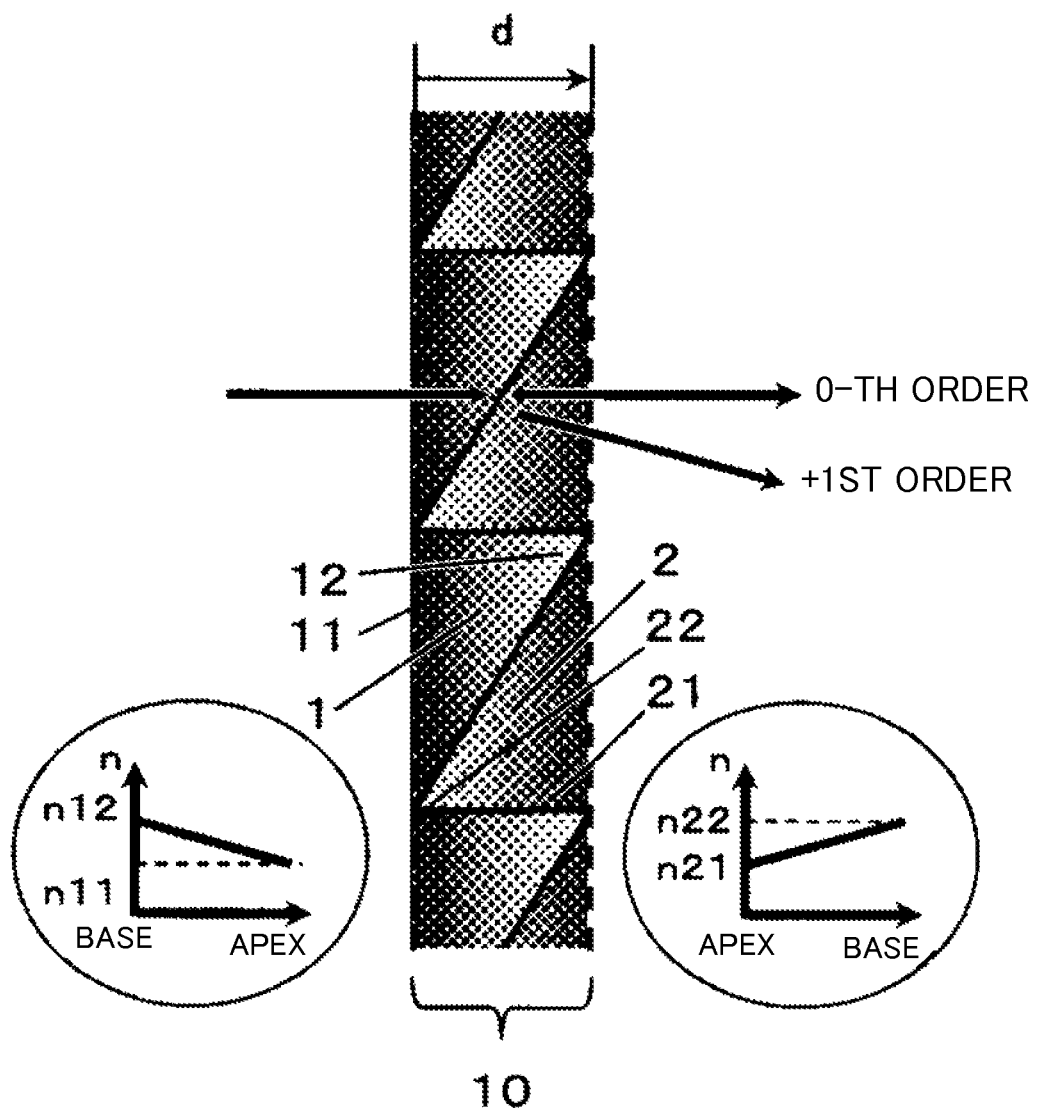
FIG. 15 is a partially enlarged sectional view of the diffractive optical element according to the eighth embodiment of the present invention.
Figure 16A:
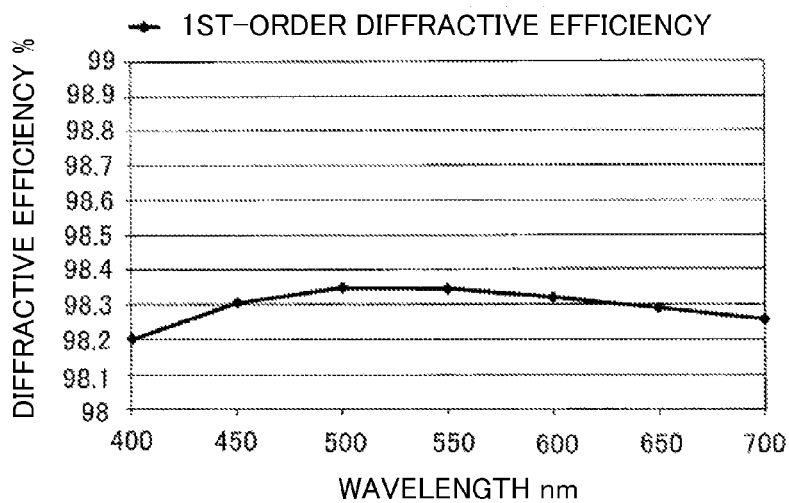
FIGS. 16A-16C are graphs of the diffractive efficiency of the diffractive optical element illustrated in FIG. 15 according to the eighth embodiment.
Figure 16B:
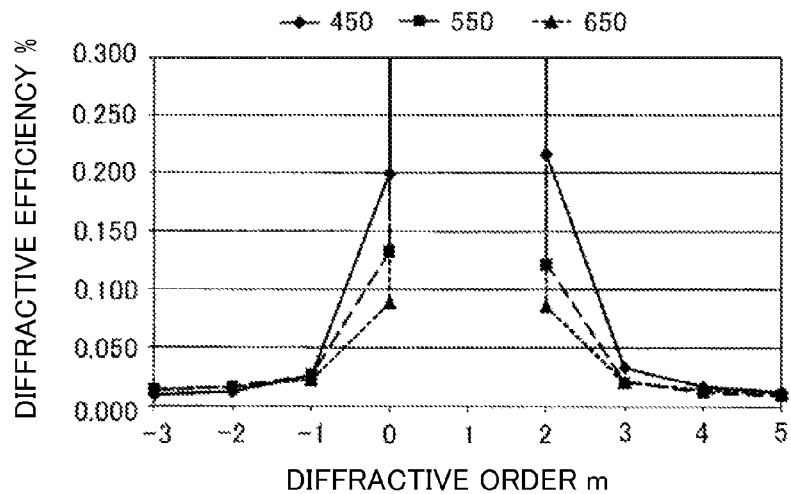
Figure 16C:
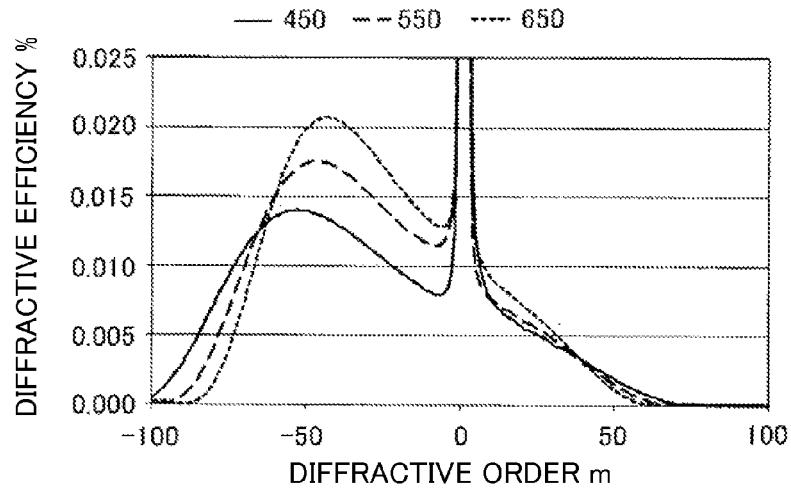

An eighth embodiment is different from the fifth to seventh embodiments in slope direction of the refractive index distribution of the first diffractive grating. FIG. 15 is a partially enlarged sectional view of the DOE 10 taken along the A-A' line illustrated in FIG. 1 according to the eighth embodiment. Table 16 illustrates each refractive index. FIG. 16 illustrates a result evaluated by the RCWA calculation. Table 17 illustrates numerical values of $\Delta\Phi1$ $\Delta\Phi2$, $\Delta\Phi1 \times \Delta\Phi2$, $\Delta\Phi1+\Delta\Phi2$, and $\Phi av$:

TABLE 16

| WAVELENGTH | FIRST DIFFRACTIVE GRATING | | SECOND DIFFRACTIVE GRATING | |
|---|---|---|---|---|
| | REFRACTIVE INDEX OF BASE SECTION n11 ITO-15.6% | REFRACTIVE INDEX OF APEX SECTION n12 ITO-14.4% | REFRACTIVE INDEX OF APEX SECTION n22 $ZrO_2$-5.7% | REFRACTIVE INDEX OF BASE SECTION n21 $ZrO_2$-6.3% |
| 400 nm | 1.53655 | 1.52958 | 1.56841 | 1.57109 |
| 450 nm | 1.52405 | 1.51761 | 1.56060 | 1.56324 |
| 500 nm | 1.51378 | 1.50783 | 1.55501 | 1.55761 |
| 550 nm | 1.50532 | 1.49981 | 1.55100 | 1.55358 |
| 600 nm | 1.49778 | 1.49267 | 1.54804 | 1.55060 |
| 650 nm | 1.49044 | 1.48577 | 1.54577 | 1.54832 |
| 700 nm | 1.48288 | 1.47867 | 1.54396 | 1.54649 |

TABLE 17

| WAVELENGTH | $\Delta\Phi1$ | $\Delta\Phi2$ | $\Delta\Phi1 \times \Delta\Phi2$ | $\Delta\Phi1 + \Delta\Phi2$ | $\Phi av$ |
|---|---|---|---|---|---|
| 400 nm | 0.1221 | −0.1439 | −0.0176 | −0.0217 | 1.0109 |
| 450 nm | 0.1048 | −0.1177 | −0.0123 | −0.0129 | 1.0065 |
| 500 nm | 0.0911 | −0.0974 | −0.0089 | −0.0063 | 1.0031 |
| 550 nm | 0.0846 | −0.0775 | −0.0066 | 0.0071 | 0.9964 |
| 600 nm | 0.0766 | −0.0641 | −0.0049 | 0.0126 | 0.9937 |
| 650 nm | 0.0618 | −0.0606 | −0.0037 | 0.0012 | 0.9994 |
| 700 nm | 0.0382 | −0.0679 | −0.0026 | −0.0296 | 1.0148 |

Thus, the effect of the present invention can be obtained in any combinations of the directions of the refractive index distributions of the first and second diffractive gratings.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-275790, filed Dec. 16, 2011, which is hereby incorporated by reference herein in its entirety.

What is claimed is:

1. A diffractive optical element made by adhering a first diffractive grating and a second diffractive grating to each other, each of the first diffractive grating and the second diffractive grating comprising a blazed structure in which a plurality of gratings each having a sawtooth shape are arranged in a grating period direction,
wherein at least one of the first diffractive grating and the second diffractive grating is made of a material having a refractive index distribution in a plane normal direction perpendicular to the grating period direction, and the following expressions are satisfied for an arbitrary wavelength $\lambda$ in a visible wavelength range, $$\Delta\Phi1(\lambda)=1-\{n22(\lambda)-n11(\lambda)\}d/m\lambda$$

$$\Delta\Phi2(\lambda)=1-\{n21(\lambda)-n12(\lambda)\}d/m\lambda$$

$$\Delta\Phi1(\lambda)\times\Delta\Phi2(\lambda)<0$$

where $n11(\lambda)$ and $n12(\lambda)$ are refractive indices for light having the wavelength $\lambda$ of a base section of the sawtooth shape of the first diffractive grating and an apex section of the sawtooth shape of the first diffractive grating, respectively, $n21(\lambda)$ and $n22(\lambda)$ are refractive indices for the light having the wavelength $\lambda$ of a base section of the sawtooth shape of the second diffractive grating and an apex section of the sawtooth shape of the second diffractive grating, respectively, d is an absolute value of a grating height of the first or second diffractive grating, and m is a designed order.

2. The diffractive optical element according to claim 1, wherein the refractive index distribution linearly increases or linearly decreases in the plane normal direction.

3. The diffractive optical element according to claim 1, wherein $\Delta\Phi1(\lambda)\times\Delta\Phi2(\lambda)$ becomes smaller as the wavelength $\lambda$ becomes shorter.

4. The diffractive optical element according to claim 1, wherein there is at least one wavelength that enables $\Delta\Phi1(\lambda)+\Delta\Phi2(\lambda)$ to be 0 in the visible wavelength range.

5. The diffractive optical element according to claim 1, wherein the following expression is further satisfied:

$$|\Delta\Phi1(\lambda)+\Delta\Phi2(\lambda)|<0.03.$$

6. The diffractive optical element according to claim 1, wherein $\Delta\Phi1(\Delta)+\Delta\Phi2(\lambda)$ increases or decreases as the wavelength $\lambda$ becomes shorter in at least one half of the visible wavelength range.

7. The diffractive optical element according to claim 1, wherein the following expression is further satisfied:

$$0.98<\{n1av(\Delta)-n2av(\lambda)\}d/m\lambda<1.02$$

where $n1av(A)$ and $n2av(A)$ are average refractive indices defined as follows:

$$n1av(\lambda)=\{n11(\lambda)+n12(\lambda)\}/2$$

$$n2av(\lambda)=\{n21(\lambda)+n22(\lambda)\}/2.$$

8. The diffractive optical element according to claim 1, wherein a maximum refractive index difference for d-line in the refractive index distribution is set from 0.002 to 0.015.

9. The diffractive optical element according to claim 1, wherein the at least one of the first diffractive grating and the second diffractive grating, which one has the refractive index distribution, is made of resin in which nanoparticles are dispersed.

10. The diffractive optical element according to claim 9, wherein a dispersion ratio of the nanoparticles is different in the plane normal direction.

11. The diffractive optical element according to claim 9, wherein the nanoparticles are Indium Tin Oxide nanoparticles.

12. The diffractive optical element according to claim 9, wherein the refractive index distribution has a volume ratio from 0.5% to 5%.

13. The diffractive optical element according to claim 1, wherein the refractive index distribution of the apex section is wider than that of the base section.

14. The diffractive optical element according to claim 13, wherein in one of the first diffractive grating and the second diffractive grating the refractive index distribution of the apex section is wider than that of the base section, and the other of the first diffractive grating and the second diffractive grating has a constant refractive index or in the other of the first diffractive grating and the second diffractive grating the refractive index distribution of the apex section is narrower than that of the base section, and wherein an absolute value of a maximum refractive index difference of the refractive index difference of the one of the first diffractive grating and the second diffractive grating is larger than that of the other of the first diffractive grating and the second diffractive grating.

15. The diffractive optical element according to claim 13, wherein each of the first diffractive grating and the second diffractive grating is made of a material in which the refractive index distribution of the apex section is wider than that of the base section.

16. The diffractive optical element according to claim 1, wherein the designed order is +1st order or −1st order.

17. The diffractive optical element according to claim 1, wherein the diffractive optical element has a grating pitch from 80 μm to 10 mm.

18. An optical system comprising a diffractive optical element according to claim 1.

19. An optical apparatus comprising an optical system according to claim 18.

* * * * *